United States Patent [19]
Lomet

[11] Patent Number: 5,933,838
[45] Date of Patent: Aug. 3, 1999

[54] DATABASE COMPUTER SYSTEM WITH APPLICATION RECOVERY AND RECOVERY LOG SEQUENCE NUMBERS TO OPTIMIZE RECOVERY

[75] Inventor: David B. Lomet, Redmond, Wash.

[73] Assignee: Microsoft Corporation, Redmond, Wash.

[21] Appl. No.: 08/826,610

[22] Filed: Apr. 4, 1997

Related U.S. Application Data

[63] Continuation-in-part of application No. 08/813,982, Mar. 10, 1997, Pat. No. 5,870,763, and a continuation-in-part of application No. 08/814,808, Mar. 10, 1997.

[51] Int. Cl.$^6$ ........................................................ G06F 17/30
[52] U.S. Cl. .............................. 707/202; 707/8; 707/204
[58] Field of Search ................................ 707/202, 8, 204

[56] References Cited

U.S. PATENT DOCUMENTS

| | | | |
|---|---|---|---|
| 4,665,520 | 5/1987 | Strom et al. | 395/182.13 |
| 5,043,866 | 8/1991 | Myre, Jr. et al. | 707/202 |
| 5,222,217 | 6/1993 | Blount et al. | 707/204 |
| 5,278,982 | 1/1994 | Daniels et al. | 707/202 |
| 5,280,611 | 1/1994 | Mohan et al. | 707/8 |
| 5,287,501 | 2/1994 | Lomet | 707/202 |
| 5,369,757 | 11/1994 | Spiro et al. | 395/182.17 |
| 5,485,608 | 1/1996 | Lomet et al. | 707/202 |
| 5,524,205 | 6/1996 | Lomet et al. | 395/182.14 |
| 5,581,750 | 12/1996 | Haderle et al. | 707/202 |
| 5,594,863 | 1/1997 | Stiles | 395/182.13 |

OTHER PUBLICATIONS

C. Mohan et al., "ARIES: A Transaction Recovery Method Supporting Fine–Granularity Locking and Partial Rollbacks Using Write–Ahead Logging" *ACM Trans. On Database Systems* 17,1 (Mar. 1992) 94–162.

The Recovery Manager Of The Advanced Information Management Prototype, Kuspert et al., IBM Heidelberg Scientific Center, Germany, 1989.

Memory Management And Rollback Recovery In Parallel Architectures, Kun–Lung Wu, University of Illinois at Urbana–Champaign, 1990 (Q.004TA90WU .C001).

Distributed Multi–Level Recovery in Main–Memory Databases Bohannon et al., Bell Labs, Murray Hill, NJ IEEE 1996.

*Primary Examiner*—Wayne Amsbury
*Assistant Examiner*—Shahid Alam
*Attorney, Agent, or Firm*—Lee & Hayes, PLLC

[57] ABSTRACT

This invention concerns a database computer system and method for making applications recoverable from system crashes. The application state (i.e., address space) is treated as a single object which can be atomically flushed in a manner akin to flushing individual pages in database recovery techniques. To enable this monolithic treatment of the application, executions performed by the application are mapped to logical loggable operations which can be posted to the stable log. Any modifications to the application state are accumulated and the application state is periodically flushed to stable storage using an atomic procedure. The application recovery integrates with database recovery, and effectively eliminates or at least substantially reduces the need for check pointing applications. In addition, optimization techniques are described to make the read, write, and recovery phases more efficient.

27 Claims, 24 Drawing Sheets

DATABASE COMPUTER SYSTEM WITH APPLICATION RECOVERY AND RECOVERY LOG SEQUENCE NUMBERS TO OPTIMIZE RECOVERY

RELATED APPLICATIONS

This is a continuation-in-part of U.S. patent application Ser. No. 08/813,982 and now U.S. Pat. No. 5,870,763 U.S. patent application Ser. No. 08/814,808, now pending, which were both filed Mar. 10, 1997 in the name of David B. Lomet, and are both assigned to Microsoft Corporation.

TECHNICAL FIELD

This invention relates to database computer systems and applications that execute on them. More particularly, this invention relates to methods for recovering from system crashes in a manner that ensures that the applications themselves persist across the crash.

BACKGROUND OF THE INVENTION

Computer systems occasionally crash. A "system crash" is an event in which the computer quits operating the way it is supposed to operate. Common causes of system crashes include power outage, application operating error, and computer goblins (i.e., unknown and often unexplained malfunctions that tend to plague even the best-devised systems and applications). System crashes are unpredictable, and hence, essentially impossible to anticipate and prevent.

A system crash is at the very least annoying, and may result in serious or irreparable damage. For standalone computers or client workstations, a local system crash typically results in loss of work product since the last save interval. The user is inconvenienced by having to reboot the computer and redo the lost work. For servers and larger computer systems, a system crash can have a devastating impact on many users, including both company employees as well as its customers.

Being unable to prevent system crashes, computer system designers attempt to limit the effect of system crashes. The field of study concerning how computers recover from system crashes is known as "recovery." Recovery from system crashes has been the subject of much research and development.

In general, the goal of redo recovery is to return the computer system after a crash to a previous and presumed correct state in which the computer system was operating immediately prior to the crash. Then, transactions whose continuations are impossible can be aborted. Much of the recovery research focuses on database recovery for database computer systems, such as network database servers or mainframe database systems. Imagine the problems caused when a large database system having many clients crashes in the midst of many simultaneous operations involving the retrieval, update, and storage of data records. Database system designers attempt to design the database recovery techniques which minimize the amount of data lost in a system crash, minimize the amount of work needed following the crash to recover to the pre-crash operating state, and minimize the performance impact of recovery on the database system during normal operation.

FIG. 1 shows a database computer system 20 having a computing unit 22 with processing and computational capabilities 24 and a volatile main memory 26. The volatile main memory 26 is not persistent across crashes and hence is presumed to lose all of its data in the event of a crash. The computer system also has a non-volatile or stable database 28 and a stable log 30, both of which are contained on stable memory devices, e.g. magnetic disks, tapes, etc., connected to the computing unit 22. The stable database 28 and log 30 are presumed to persist across a system crash. The persistent database 28 and log 30 can be combined in the same storage, although they are illustrated separately for discussion purposes.

The volatile memory 26 stores one or more applications 32, which execute on the processor 24, and a resource manager 34. The resource manager 34 includes a volatile cache 36, which temporarily stores data destined for the stable database 28. The data is typically stored in the stable database and volatile cache in individual units, such as "pages." A cache manager 38 executes on the processor 24 to manage movement of data pages between the volatile cache 36 and the stable database 28. In particular, the cache manager 38 is responsible for deciding which data pages should be moved to the stable database 28 and when the data pages are moved. Data pages which are moved from the cache to the stable database are said to be "flushed" to the stable state. In other words, the cache manager 38 periodically flushes the cached state of a data page to the stable database 28 to produce a stable state of that data page which persists in the event of a crash, making recovery possible.

The resource manager 34 also has a volatile log 40 which temporarily stores computing operations to be moved into the stable log 30. A log manager 42 executes on the processor 24 to manage when the operations are moved from the volatile log 40 to the stable log 30. The transfer of an operation from the volatile log to the stable log is known as a log flush.

During normal operation, an application 32 executes on the processor 24. The resource manager receives requests to perform operations on data from the application. As a result, data pages are transferred to the volatile cache 36 on demand from the stable database 28 for use by the application. During execution, the resource manager 34 reads, processes, and writes data to and from the volatile cache 36 on behalf of the application. The cache manager 38 determines, independently of the application, when the cached Data State is flushed to the stable database 28.

Concurrently, the operations being performed by the resource manager on behalf of the application are being recorded in the volatile log 40. The log manager 42 determines, as guided by the cache manager and the transactional requirements imposed by the application, when the operations are posted as log records on the stable log 30. A logged operation is said to be "installed" when the versions of the pages containing the changes made by the operation have been flushed to the stable database.

When a crash occurs, the application state (i.e., address space) of any executing application 32, the data pages in volatile cache 36, and the operations in volatile log 40 all vanish. The computer system 20 invokes a recovery manager which begins at the last flushed state on the stable database 28 and replays the operations posted to the stable log 30 to restore the database of the computer system to the state as of the last logged operation just prior to the crash.

Explaining how to recover from a system crash requires answering some fundamental questions.

1. How can the designer be sure that recovery will succeed?
2. How can the stable state be explained in terms of what operations have been installed and what operations have not?

3. How should recovery choose the operations to redo in order to recover an explainable state?
4. How should the cache manager install operations via its flushing of database pages to the stable state in order to keep the state explainable, and hence recoverable?

The answers to these questions can be found in delicately balanced and highly interdependent decisions that a system designer makes.

One prior art approach to database recovery is to require the cache manager to flush the entire cache state periodically. The last such flushed state is identified in a "checkpoint record" that is inserted into the stable log. During recovery, a redo test is performed to determine whether a logged operation needs to be redone to help restore the system to its pre-crash state. The redo test is simply whether an operation follows the last checkpoint record on the log. If so (meaning that a later operation occurred and was posted to the stable log, but the results of the operation were not installed in the stable database), the computer system performs a redo operation using the log record.

This simple approach has a major drawback in that writing every change of the cached state out to the stable database 28 is practically unfeasible. It involves a high volume of input/output (I/O) activity that consumes a disproportionate amount of processing resources and slows the system operation. It also requires atomic flushing of multiple pages, which is a troublesome complication. This was the approach used in System R., described in: Gray, McJones, et al, "The Recovery Manager of the System R Database Manager," ACM Computing Surveys 13,2 (June, 1981) pages 223–242.

Another prior art approach to database recovery, which is more widely adopted and used in present-day database systems, involves segmenting data from the stable database into individual fixed units, such as pages. Individual pages are loaded into the volatile cache and logged resource manager operations can read and write only within the single pages, thereby modifying individual pages. The cache manager does not flush the page after every incremental change.

Each page can be flushed atomically to the stable database, and independently of any other page. Intelligently flushing a page after several updates have been made to the page produces essentially the same result as flushing each page after every update is made. That is, flushing a page necessarily includes all of the incremental changes made to that page leading up to the point when the flushing occurs.

The cache manager assigns a monotonically increasing state ID to the page each time the page is updated. During recovery, each page is treated as if it were a separate database. Resource manager operations posted to the stable log are also assigned a state ID. A redo test compares, for each page, the state ID of a stable log record with the state ID of the stable page. If the log record state ID is greater than the state ID of the stable page (meaning that one or more operations occurred later and were recorded in the stable log, but the page containing updates caused by the later operations was not yet flushed to the stable database), the computer system performs a redo operation using the last stable page and the operations posted to the stable log that have state IDs higher than the state ID of the stable page.

While these database recovery techniques are helpful for recovering data, in the database, the recovery techniques offer no help to recovering an application from a system crash. Usually all active applications using the database are wiped out during a crash. Any state in an executing application is erased and cannot usually be continued across a crash.

FIG. 2 shows a prior art system architecture of the database computer system 20. The applications 32(1)–32(N) execute on the computer to perform various tasks and functions. During execution, the applications interact with the resource manager 26, with each other, and with external devices, as represented by an end user terminal 44. The application states can change as a result of application execution, interaction with the resource manager 26, interaction with each other, and interaction with the terminal 44. In conventional systems, the application states of the executing applications 32(1)–32(N) are not captured. There is no mechanism in place to track the application state as it changes, and hence, there is no way to recover an application from a crash which occurs during its execution.

When the application is simple and short, the fact that applications are not recoverable is of little consequence. For example, in financial applications like debit/credit, there may be nothing to recover that was not already captured by the state change within the stable database. But this might not always be the case. Long running applications, which frequently characterize workflow systems, present problems. Like long transactions that are aborted, a crash interrupted application may need to be re-scheduled manually to bring the application back online. Applications can span multiple database transactions whereby following a system crash, the system state might contain an incomplete execution of the application. Cleanly coping with partially completed executions can be very difficult. One cannot simply re-execute the entire activity because the partially completed prior execution has altered the state. Further, because some state changes may have been installed in the stable database, one cannot simply undo the entire activity because the transactions are guaranteed by the system to be persistent. The transactions might not be undoable in any event because the system state may have changed in an arbitrary way since they were executed.

Accordingly, there is a need for recovery procedures for preserving applications across a system crash. Conceptually, the entire application state (i.e., the address space) could be posted to the stable log after each operation. This would permit immediate recovery of the application because the system would know exactly, from the last log entry for the application, the entire application state just prior to crash. Unfortunately, the address space is typically very large and continuously logging such large entries is too expensive in terms of I/O processing resources and the large amounts of memory required to hold successive images of the application state.

There are several prior art techniques that have been proposed for application recovery. All have difficulties that restrict their usefulness. One approach is to make the application "stateless." Between transactions, the application is in its initial state or a state internally derived from the initial state without reference to the persistent state of the database. If the application fails between transactions, there is nothing about the application state that cannot be re-created based on the static state of the stored form of the application. Should the transaction abort, the application is replayed, thereby re-executing the transaction as if the transaction executed somewhat later. After the transaction commits, the application returns to the initial state. This form of transaction processing is described by Gray and Reuter in a book entitled, *Transaction Processing: Concepts and Techniques*, Morgan Kaufmann (1993), San Mateo, Calif.

Another approach is to reduce the application state to some manageable size and use a recoverable resource manager to store it. The resource manager might be a database or a recoverable queue. Reducing state size can be facilitated by the use of a scripting language for the application. In this case, the script language interpreter stores the entire application state at well-chosen times so that failures at inappropriate moments survive, and the application execution can continue from the saved point.

Another technique is to use a persistent programming language that logs updates to a persistent state. The idea is to support recoverable storage for processes. When the entire state of the application is contained in recoverable storage, the application itself can be recovered. Recoverable storage has been handled by supporting a virtual memory abstraction with updates to memory locations logged during program execution. If the entire application state is made recoverable, a very substantial amount of logging activity arises. This technique is described in the following publications: Chang and Mergen, "801 Storage: Architecture and Programming," *ACM Trans. on Computer Systems*, 6, 1 (Feburary 1988) pages 28–50; and Haskin et al., "Recovery Management in QuickSilver," *ACM Trans. on Computer Systems*, 6,1 (Feburary 1988) pages 82–108.

Another approach is to write persistent application checkpoints at every resource manager interaction. The notion here is that application states in between resource manager interactions can be re-created from the last such interaction forward. This is the technique described by Bartlett, "A NonStop Kernel," *Proc. ACM Symp. on Operating System Principles* (1981) pages 22–29 and Borg et al. "A Message System Supporting Fault Tolerance," *Proc. ACM Symp. on Operating System Principles* (October 1983) Bretton Woods, N.H. pages 90–99. The drawback with this approach is that short code sequences between interactions can mean frequent checkpointing of very large states as the state changes are not captured via operations, although paging techniques can be used to capture the differences between successive states at, perhaps, page level granularity.

The inventor has developed an improved application recovery technique.

SUMMARY OF THE INVENTION

This invention concerns a database computer system and method for making applications recoverable from system crashes. The application state (i.e., address space) is treated as a single object that can be atomically flushed in a manner akin to flushing individual pages in database recovery techniques. And like the pages of the database, log records describing application state changes are posted on the stable log before application state is flushed.

To enable this monolithic treatment of the application, executions performed by the application are mapped to loggable operations which are posted to the stable log. Any modifications to the application state are accumulated and the application state is flushed from time to time to stable storage using an atomic write procedure. Flushing the application state to stable storage effectively installs the application operations logged in the stable log. Since the application state can be very large, a procedure known as "shadowing" can be used to atomically flush the entire application state. As a result, the application recovery integrates with database recovery, and substantially reduces the need for checkpointing applications, i.e. logging or flushing the entire application state. According to one implementation, a database computer system has a processing unit, a volatile main memory that does not persist across a system crash, and a stable memory that persists across a system crash. The volatile memory includes a volatile cache which maintains cached states of the application address space and data records and a volatile log which tracks the operations performed by the computer system. The stable memory includes a stable database which stores stable states of the application address space and data records and a stable log which holds a stable version of the log records that describe state changes to the stable database.

The database computer system has at least one application which executes from the main memory on the processing unit. A resource manager is stored in main memory and mediates all interaction between the application and the external world (e.g., user terminal, data file, another application, etc.). During execution, the internal state changes of the application arc not visible to the outside world. However, each time the application interacts with the resource manager, either the application state is exposed or the application senses the external state. The resource manager tags the application states at these interaction points by assigning them state IDs. Application operations are defined that produce the transitions between these application states. These operations are immediately entered into the volatile log, and subsequently posted to the stable log.

The application state is treated as a single object that can be atomically flushed to the stable database. In addition, the application operations often cause changes to the data pages, records, or other types of objects stored in the volatile cache. The modified objects that result from application operations are from time to time flushed to the stable database. The flushed application states and objects are assigned state IDs to identify their place in the execution sequence. Flushing the application object effectively installs all the operations, updating the application operations that are in the stable log which have earlier state IDs.

In the event of a system failure, the database computer system begins with the stable database state and replays the stable log to redo certain logged application operations. The database computer system redoes a logged application operation if its state ID is later in series than the state ID of the most recently flushed or already partially recovered application state.

Another aspect of this invention is to optimize the application read operation to avoid writing the object data read to the log record. Posting the read values to the log is helpful in one sense because the cache manager is not concerned about which sequence to flush objects. Certain object states need not be preserved by a particular flushing order because any data values obtained from an object which are needed to redo an application operation are available directly from the stable log. However, posting objects to the log often involves writing large amounts of data, and duplicating data found elsewhere on the system.

The read optimizing technique eliminates posting the read values to the log by substituting, for the read values, an identity of the location from where the values are read and posting the identity instead of the values. However, the data is now only available from the read object itself and hence, attention must be paid to the order in which objects are flushed to stable storage. If objects are flushed out of proper sequence, a particular state of an object may be irretrievably lost.

A cache manager has an object table which tracks the objects maintained in the volatile cache. The object table includes fields to track dependencies among the objects. In one implementation, the object table includes, for each object entry, a predecessor field which lists all objects that must be flushed prior to the subject object, and a successor field which lists all objects before which the subject object must be flushed. In another implementation, the object table contains, for each object entry, a node field to store dependencies in terms of their nodes in a write graph formulation.

Another aspect of this invention is to optimize the application write operation to avoid posting large amounts of data to the log record. Posting the values to be written is helpful in one sense because the cache manager is not concerned about which sequence to flush objects. However, the process is inefficient and costly in terms of computational resources.

The write optimization technique eliminates posting the write values to the log by substituting, for those values, an identity of the object from where the values originate and posting the identity instead of the values. While this reduces the amount of data to be logged, the write optimization technique introduces dependencies between objects, and often troubling "cycle" dependencies when the read optimization technique is also being used, which can require atomic and simultaneous flushing of multiple objects.

The cache manager tracks dependencies via the object table and is configured to recognize cycle dependencies. When a cycle dependency is realized, the cache manager initiates a blind write of one or more objects involved in the cycle to place the objects' values on the stable log. This process breaks the cycle. Thereafter, the cache manager flushes the objects according to an acyclic flushing sequence that pays attention to any predecessor objects that first require flushing.

Still another aspect of this invention is to optimize the recovery procedures invoked following a system crash. During normal operation, each log record is assigned a log sequence number (LSN). The cache manager maintains a recovery log sequence number (rLSN) that identifies the first log record for an associated object at which to begin replaying the operations during recovery. The cache manager occasionally flushes an object to non-volatile memory to install the operations performed on the object. On some occasions, the flushing of one object installs operations that wrote another data object that has not yet been flushed (i.e., an object that is unexposed in the write graph, meaning that its contents are not needed for recovery). The cache manager advances the rLSN for both objects to identify subsequent log records that reflect the objects at states in which the operations that previously wrote the states are installed in the non-volatile memory.

During recovery, the recovery manager starts at the advanced rLSNs to avoid replaying operations that are rendered unnecessary by subsequent operations, thereby optimizing recovery.

BRIEF DESCRIPTION OF THE DRAWINGS

FIG. 6 shows a logical execution operation.

FIG. 27 illustrates advancing the point to begin recovery according to the recovery optimization techniques.

DETAILED DESCRIPTION OF THE PREFERRED EMBODIMENT

This invention concerns a recovery scheme that renders both data records and application programs persistent across system crashes. In general, the recovery scheme extends page-oriented, database style recovery to application programs. An application program's state is manifested in the application's address space. According to an aspect of this invention, the application state is treated as a single cached object, akin to a single memory page, which can be atomically flushed to a stable database. Application executions occurring between resource manager interactions are mapped to loggable operations that are posted to a stable log. The results of the application executions as they impact other objects, such as data pages, are also captured as logged operations. The results of these operations are also from time to time flushed to the stable database. As a result, the recovery scheme allows integration of application recovery with database recovery.

The application recovery scheme is based on application replay. Application executions are logged during normal operation and are replayed during recovery. This reduces the recovery overhead for normal system operation while shifting more of the burden to the recovery process, wherein the logged application operations will need to be re-executed during recovery.

Figure 1:
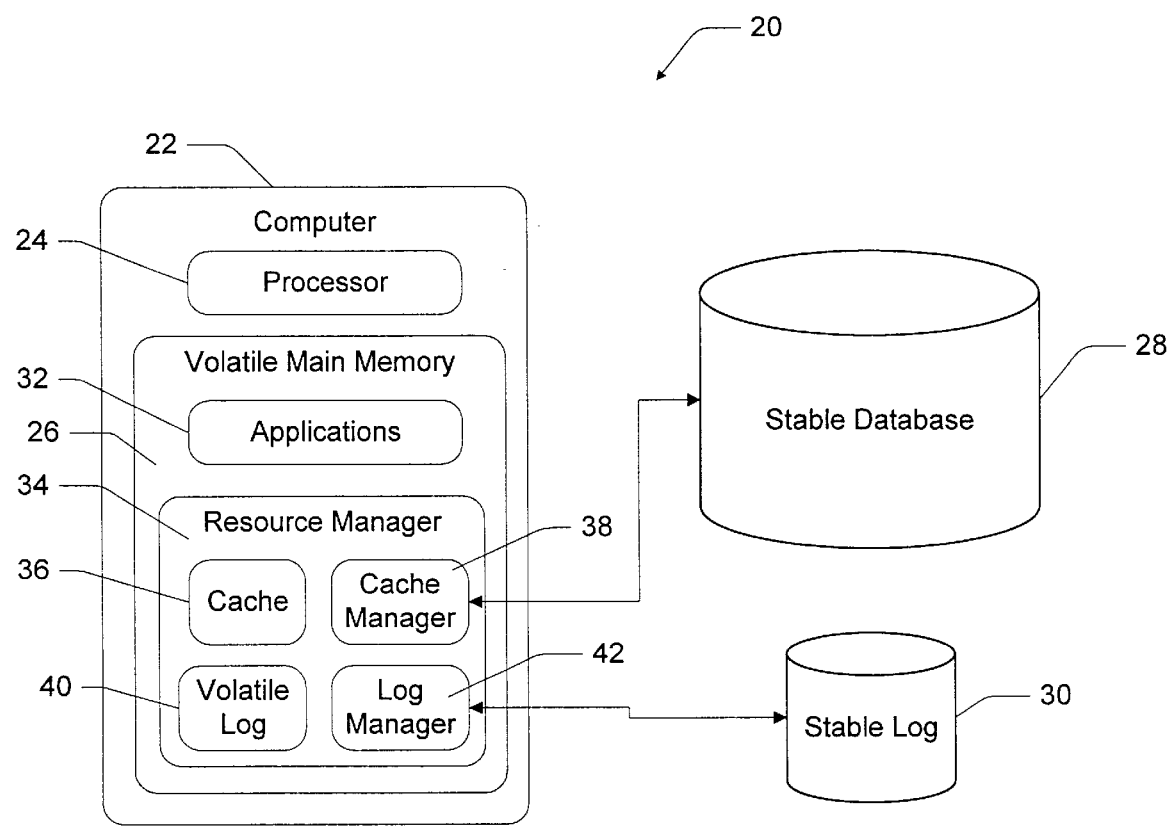
FIG. 1 is a diagrammatic illustration of a conventional database computer system.
Figure 2:
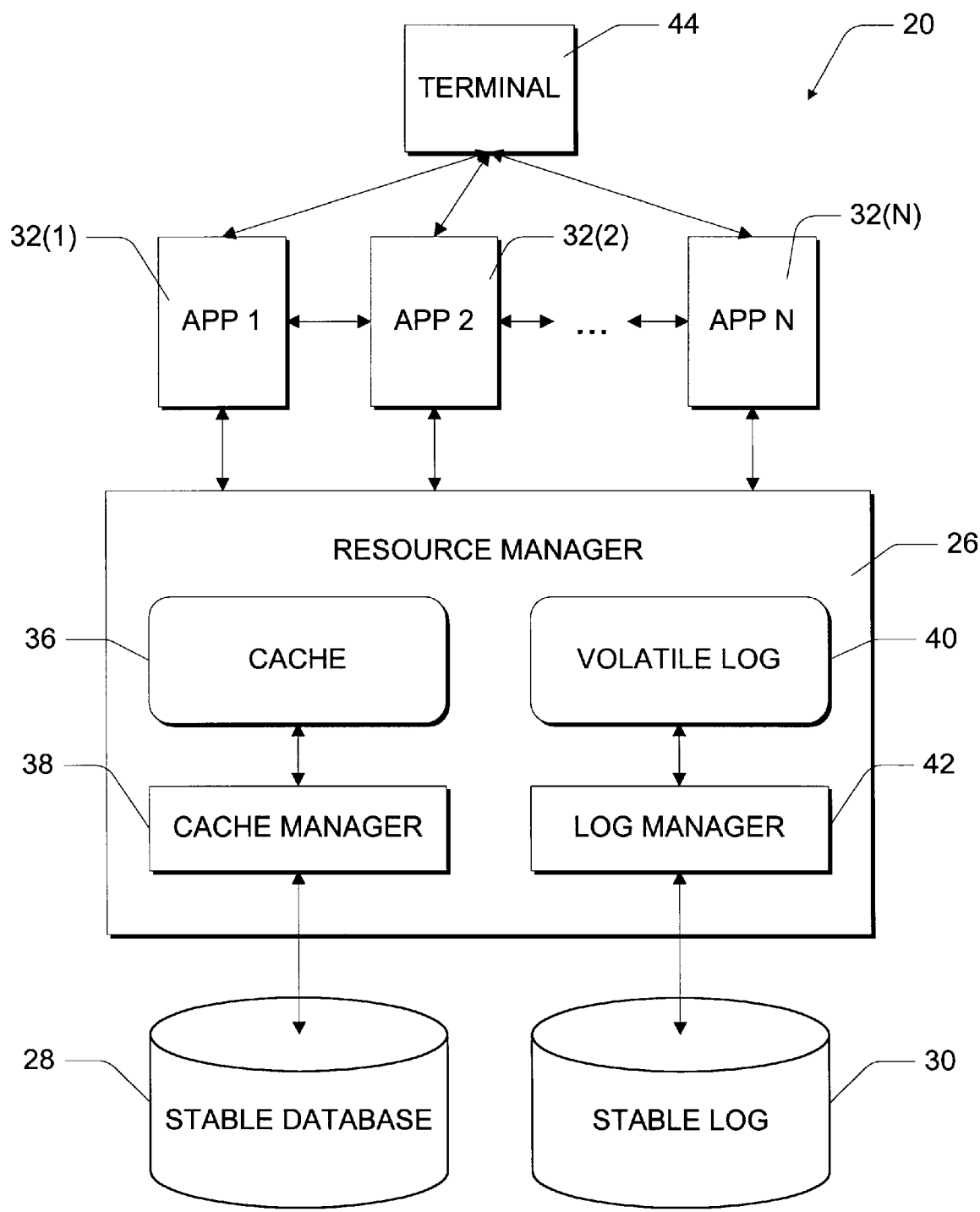
FIG. 2 is a diagrammatic illustration of a system architecture of the conventional database computer system.
Figure 3:
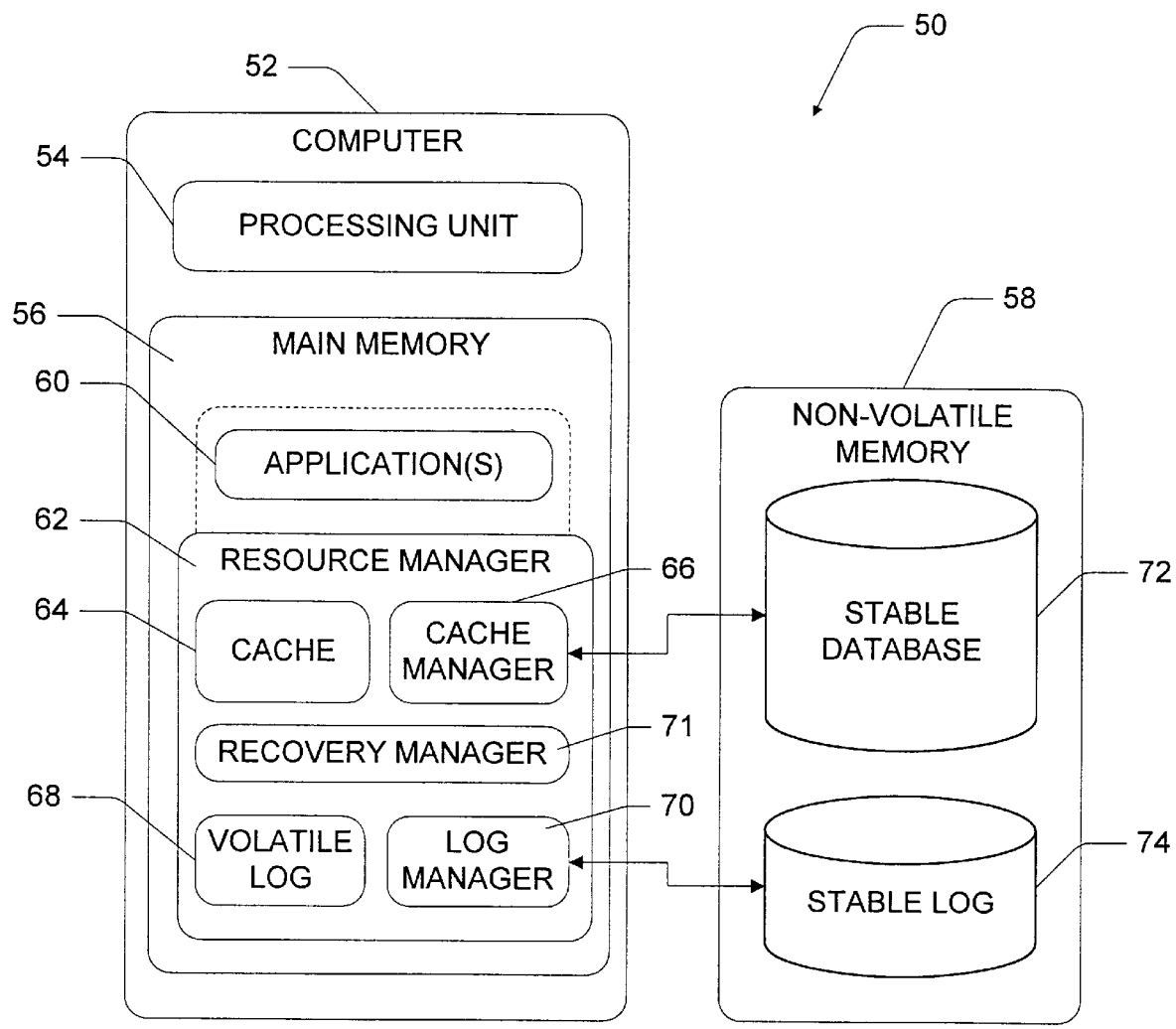
FIG. 3 is a diagrammatic illustration of a database computer system according to an implementation of this invention.

FIG. 3 shows a database computer system 50 having a computing unit 52, with a processing unit 54 and a volatile main memory 56, and a non-volatile memory 58 interfaced with the computer unit 52. The volatile main memory 56 is not persistent across system crashes. It is presumed to lose all data that it presently stores when a crash occurs. Main memory 56 can be implemented, for example, as volatile RAM. On the other hand, the persistent memory 58 is presumed to persist across a system crash. Examples of persistent memory 58 include disk arrays, disk drives (e.g., hard and floppy), read/write CD ROMS, tape backups, reel-to-reel, and the like.

The database computer system 50 is shown in an operational state in which one or more applications 60 are loaded in main memory 56 for execution on the processing unit 54. The application programs 60 are permanently stored on nonvolatile memory (such as the persistent memory 58) and loaded into the main memory 56 when launched. The applications are representative of single threaded or multi-threaded applications. For purposes of continuing discussion, suppose that one of the applications is a long running application such as those that characterize workflow systems.

The main memory 56 further includes a resource manager 62 which maintains temporary copies of the data pages and application states. The resource manager is responsible for managing when to flush data objects and application objects, and hence when to install operations into the persistent memory 58. It is also responsible for posting operations from the volatile log to the stable log. This must be done before the results of an operation are installed in the stable state, thus enforcing a write-ahead log protocol. The resource manager 62 is callable by the application programs 60 and mediates all data communication directed to and originating from the applications, as is described below in more detail with respect to FIG. 5.

The resource manager 62 includes a volatile cache 64, a cache manager 66, a volatile log 68, a log manager 70, and a recovery manager 71. The volatile cache 64 contains cached states of any executing application 60, and the data pages retrieved from the persistent memory 58. The volatile log 68 tracks the operations performed by the computer system.

The non-volatile memory 58 includes a stable database 72 and a stable log 74. The stable database 72 maintains stable versions of the application address space and data objects, and the stable log 74 maintains a stable sequence of logged computer operations. The database 72 and log 74 are shown separately, but can be implemented in the same storage subsystem.

The cache manager 66 manages the volatile cache 64 and is responsible for retrieving data records from the stable database 62 and periodically flushing modified data records back to the stable database 72. Additionally, the cache manager 66 manages when to flush cached objects, including the application state as an object to be updated in the stable database 72. The log manager 70 manages the volatile log 68 and facilitates posting operations from volatile log 68 onto the stable log 74. In doing that, it enforces the write-ahead log protocol as directed by the cache manager 66.

The database computer system 50 is representative of many diverse implementations, including a database server for a network of PCs or workstations, an online server for Internet service providers, a mainframe computing system, and the like. The database computer system 50 runs an operating system (not shown), which is preferably a multi-tasking operating system which allows simultaneous execution of multiple applications or multiple threads of one or more applications. Examples of suitable operating systems include a Windows® brand operating system sold by Microsoft Corporation, such as the Windows NT® workstation operating system, as well as UNIX based operating systems.

One aspect of this invention is to make the applications 60 persist across system crashes, without requiring the applications to take steps to ensure their persistence. The recovery procedures implemented on the database computer system 50 are designed to work with conventional applications, which are not specially modified to account for, or even be aware of, recovery considerations. The applications are treated as individual objects that are flushed from time to time to the stable database 72. In this manner, application recovery can be likened to page-oriented database style recovery in that the monolithic application state is similar to a single database page.

To realize application recovery using page-like recovery technology, the system architecture of computer system 50 is designed to handle applications as individual, monolithic objects that can be independently flushed. The basic architecture involves two design issues: (1) how to atomically flush an operation consistent application state (which can be very large) as a single object, and (2) how to map application executions to logical operations which change application state and can be posted to a stable log so that the operations can be replayed during recovery.

Beyond this general architecture, however, are several optimizing features that can be implemented to improve the efficiency and effectiveness of the application recovery system. These other features include a modified cache manager that handles such considerations as when to flush cached objects so as to avoid overwriting previous states that might still be needed.

The following discussion first addresses the basic architecture, and then follows with a description of the optimizing features.

Operation Consistent Application State

An object's operation consistent state is the state as it exists between operations. The computer system 50 flushes operation consistent objects so that recovery, which either re-executes an operation or bypasses it, works correctly. Database pages, when flushed, are operation consistent. Page updates are short duration and under the control of the resource manager; hence, operation consistency is achieved inexpensively with standard techniques, e.g. latching or pinning.

Application state operation consistency is harder to provide. Applications execute asynchronous to the resource manager. According to an aspect of this invention, the application operations capture the application execution as state transitions between interactions of the application with the resource manager. This aspect is described below in more detail. A difficulty that arises is that the operation consistent application state as of the last interaction with the resource manager no longer exists, and the cache manager has no way of knowing when the application will again interact with the resource manager to produce the next operation consistent application state.

There are several ways to provide operation consistent application state. One technique is to capture and preserve the application state as of the most recent interaction. Since the application state can be very large, capturing and preserving the entire state can be expensive. However, this technique is a viable implementation and suitable for recovery purposes, as large application states are capable of being atomically flushed to stable storage using a conventional technique known as "shadowing," which is described below.

Another technique is to force an application interaction with the resource manager. The interrupted state of the executing application becomes operation consistent by defining and logging the operations that precede and follow this state. To demonstrate, suppose that the application state for application A is between interactions with the resource manager during an application execute operation $Ex(A_i)$. The notation "$A_i$" is used throughout this disclosure to refer to an application having an identifier "A" taken at a state with a state ID of "i." To flush the application state at this intermediate point, execution of the operation $Ex(A_i)$ is halted and the resulting intermediate state is labeled $A_{i+1}$. The system defines and immediately flushes to the stable log a specially marked execution operation $Ex'(A_{i+1})$, indicating a state transition from the interrupted state $A_{i+1}$, to the state as of the next interaction, i.e. $A_{i+2}$. The forced operation $Ex'(A_{i+1})$ makes the application state $A_{i+1}$ operation consistent. Application state $A_{i+1}$ can then be flushed.

Three alternatives exist for replaying the operation $Ex'(A_{i+1})$ during recovery, depending on when a crash occurs. When application A's persistent state identifier is:

1. Greater than i+1, operation $Ex'(A_{i+1})$ is bypassed like any other installed operation;
2. Equal to i+1, operation $Ex'(A_{i+1})$ is replayed like any other application execute operation; or
3. Less than i+1, operations Ex(A) are replayed normally through state i. Operation $Ex(A_i)$ is then replayed. Recovery bypasses the operation $Ex'(A_{i+1})$ following normal replay of $Ex(A_i)$ and simply increments application A's state identifier to i+2. Replay of operation $Ex'(A_{i+1})$ can be avoided because replay of the preceding operation $Ex(A_i)$ at recovery (and hence, when $Ex(A_i)$ is not interrupted) inherently includes the execution of operation $Ex'(A_{i+1})$. This third case only arises when the system crashes between the log flush of forced operation $Ex'(A_{i+1})$ and the state flush of application state $A_{i+1}$.

Atomic Flush of Operation Consistent Application State

As part of application recovery, the database computer system 50 treats each executing application as a single object, which can be flushed from time to time to stable state in order to preserve snapshots of the application's address space. The database computer system 50 flushes the application state (which can be quite large) in an atomic operation.

Figure 4:
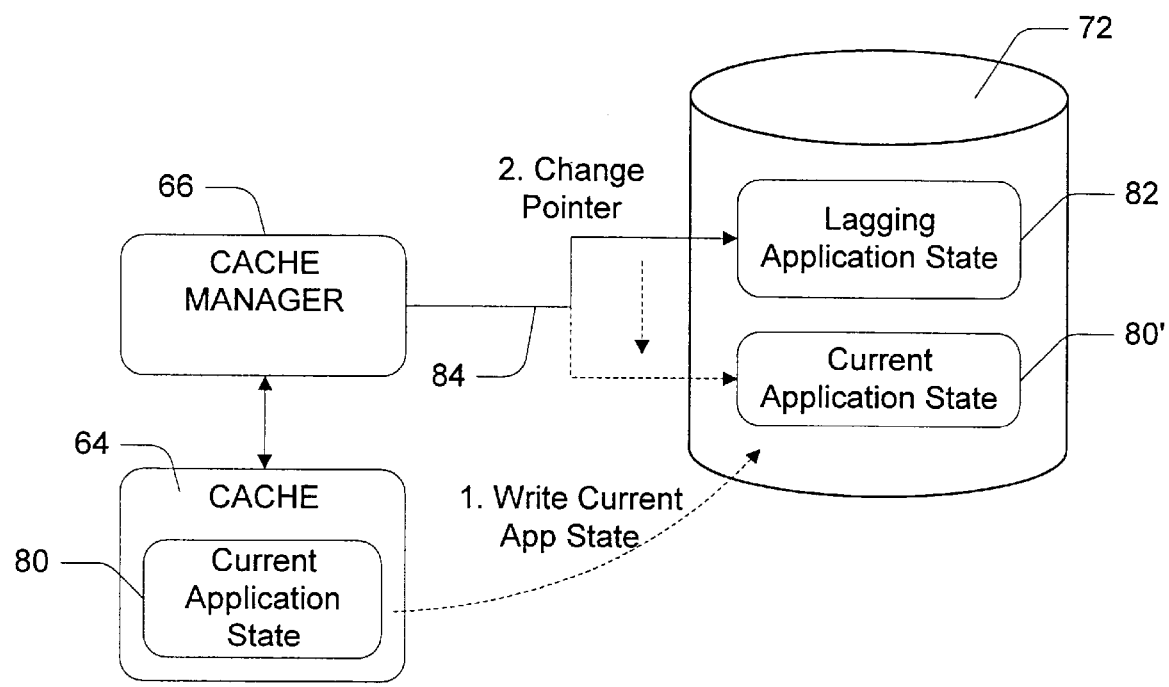
FIG. 4 is a diagrammatic illustration of a cache manager and non-volatile memory used in the database computer system, and demonstrates aspects concerning atomic installation of large application objects.

FIG. 4 shows a portion of the database computer system 50 to illustrate a technique for atomically flushing the application state as a single object. The technique is known as "shadowing." The cache manager 66 maintains two versions of the application state: a current application state 80 kept in cache 64 and a lagging application state 82 kept in stable database 72. The lagging version 82 is the most recent version of the application state that has been flushed to the stable database 72. When the cache manager 66 decides to flush the current cached version 80 of the large application state, the cache manager 66 first writes the current cached version 80 to the stable database to form a copy 80'. When the entire current version of application object has been written to the stable medium 72, the cache manager 66 moves a pointer (as represented by arrow 84) from the lagging version 82 to the new updated version 80' to place it logically within the stable database. Since the pointer 84 is small, it can be changed with a single page write. This enables the pointer to be moved between the two versions in an atomic operation. The earlier version 82 can then be discarded or overwritten.

Mapping Application Executions to Logical Loggable Operations

To ensure that operations are replayable during recovery, the operations are atomic and deterministic. An operation is said to be "atomic" if the external world that the operation sees during its execution appears to be constant, and the external world does not see the results of the execution until the operation completes. The operations are said to be "serializable" in that their execution is equivalent to an execution of the operations one at a time. An operation is said to be "deterministic" if, given the same system state as input, the result of execution against this state will always be the same output state.

To satisfy the atomic and deterministic criteria, all interactions between an application 60 and the external world (e.g., an end user, a database, a file, another application, etc.) are mediated by the resource manager 62. In this manner, the application is treated as a black box whose internal changes are not visible to the external world. These internal changes are not captured nor recorded in the volatile log. The application address space is intermittently exposed or impacted, however, every time the application interacts with the external world via the resource manager 62. Interactions with the resource manager thereby give rise to loggable operations that reflect different transitions between application states as the application executes. The application state transformations between interaction are hence logged as operations in the volatile log 68. At recovery, these logged state transformation operations are replayed, with the affect being that the hidden internal changes leading to each logged state are repeated.

Figure 5:
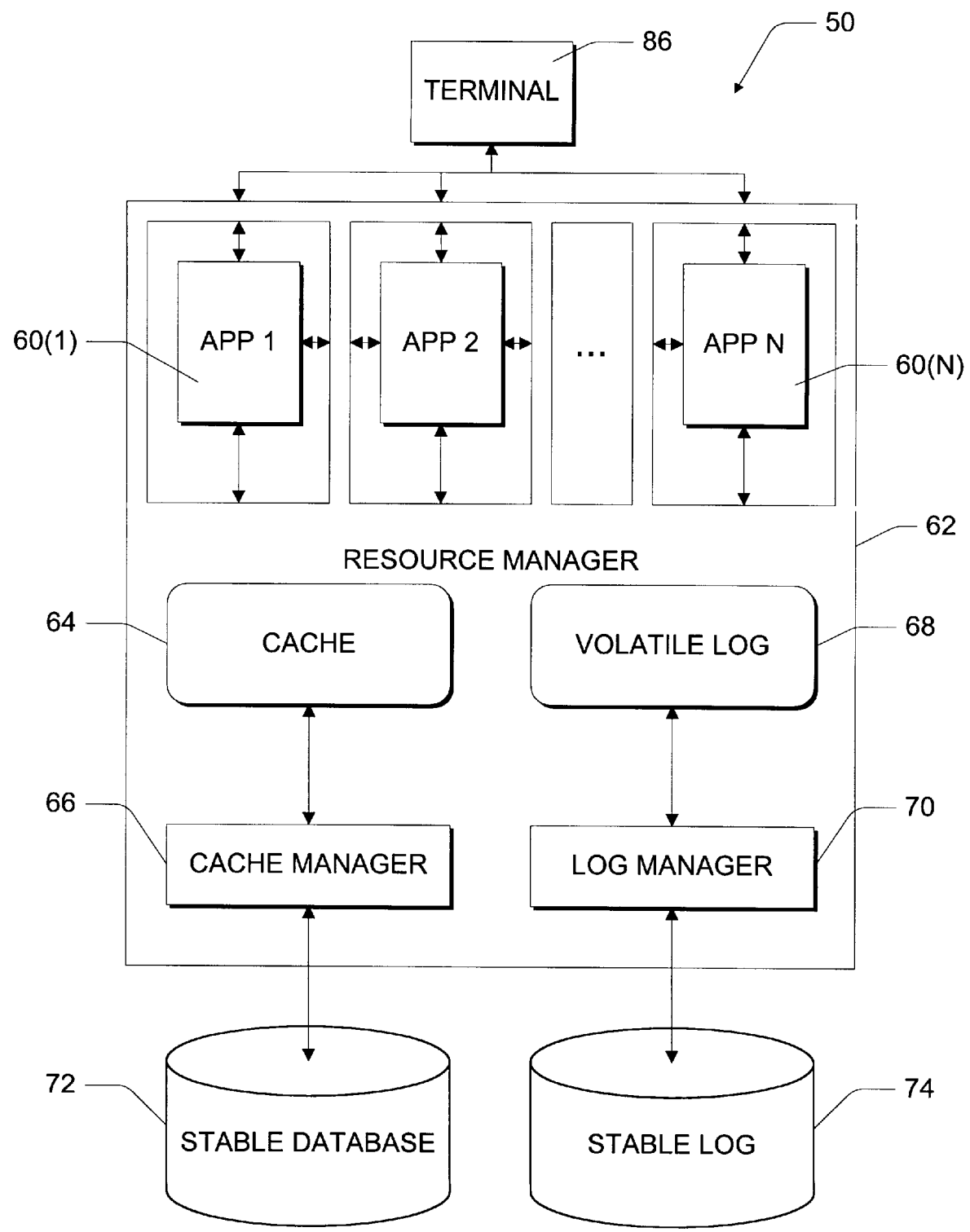
FIG. 5 is a diagrammatic illustration of a system architecture of the database computer system that enables application recovery.

FIG. 5 shows the system architecture of the database computer system 50 in more detail. Individual application programs 60(1)–60(N) are executing on the computer. The resource manager 62 provides an interface layer between each application and the external world. In this illustration, the resource manager 62 mediates all communication to and from the applications 60(1)–60(N) with respect to an end user at a terminal 86, a data file in the cache 64, or another application. To interact with any external component, an application calls to the resource manager 62 and the resource manager 62 facilitates the task requested by the application. It does this by logging the application operation(s) and then calling the requested system service that performs the requested task. This intervening resource manager layer is said to "wrap" the requested task.

Execution of an application 60 is characterized as a series of loggable atomic operations whose replay can recover the application. To capture application execution as a series of loggable operations, the computer system 50 treats the code execution between calls in the application as the log operation. Said another way, the resource manager 62 logs the operations as if it were calling the application, rather than the application calling to the resource manager. This change in perspective results in an application operation being "called" via a return from the resource manager 62 to the application 60. The application operation "returns" to the resource manager via the application's next call.

Given this shift in perspective, application execution is mapped into one of five logical operations that are loggable in the volatile log 68. The five logical operations are execute, initiate, terminate, read, and write.

1. Execute: A call from an application 60 to the resource manager 62 is treated by the system 50 as a return from an application operation. A return to the application 60 from the resource manager 62 is treated as a call to an application operation. The application execution between these interactions with the resource manager (i.e., starting at a return from the resource manager and ending at the next call from the application to the resource manager) is mapped to an execute operation.

Figure 6:
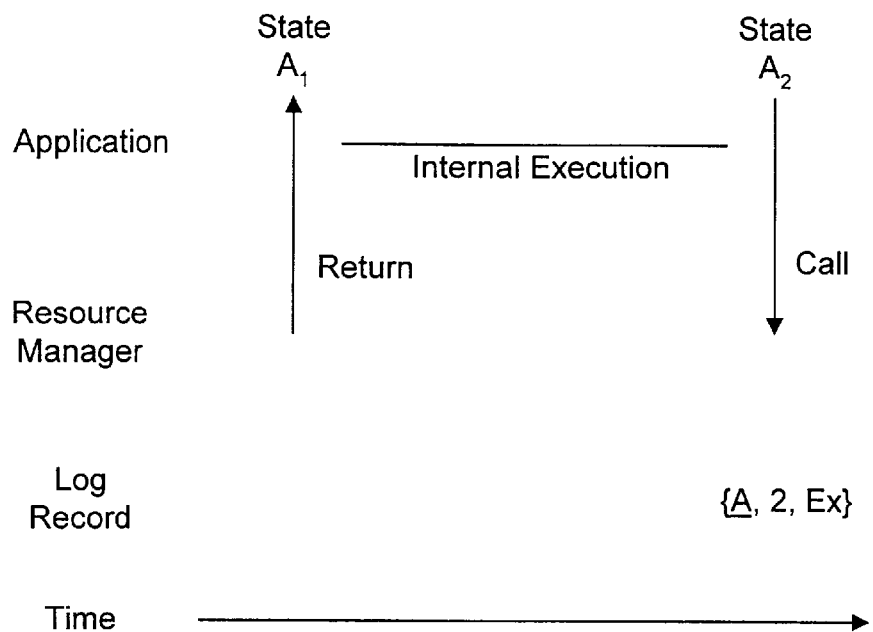
FIG. 6 is a diagrammatic illustration of application execution and interaction with a resource manager in a manner which maps application execution to loggable logical operations.

FIG. 6 shows the logical execute operation. Suppose that the application is at a state $A_1$ following a return from the resource manager. The application executes instructions internal to the application, whose effects are hidden from the external world. This execution transforms the application from a state $A_1$ to a state $A_2$. Following this execution, the application calls to the resource manager. The resource manager logs the application Execute operation $Ex(A_1)$ denoting the transformation of application A from state $A_1$ to state $A_2$ to the volatile log for subsequent posting by the log manager into the stable log. As denoted in FIG. 6, the resource manager logs the application identifier A, its state ID 2, and the execute operation Ex that resulted in the application state $A_2$.

2. Initiate: This logical operation represents the application's first state transition prior to the initial call to the resource manager 62. The resource manager 62 is notified when the application is launched. The initial application state, e.g. its static code and data structures, is read from stable memory during the launch. This action is mapped to a loggable initiate operation. The initiate operation ends when the resource manager makes the initial invocation of the application. The resource manager logs the In(A) to the volatile log for subsequent posting to the stable log.

3. Terminate: The terminate logical operation represents the application's final call to the resource manager, instructing the resource manager to terminate the application. This final application state transformation generates a "final state" for the application that can be written back to the stable memory. When control returns to the application, the application is expected to terminate cleanly and free up its resources. It is not expected to call the resource manager again. The resource manager logs the Terminate(A) operation to the volatile log for subsequent posting to the stable log.

4. Read: The application 60 calls the resource manager 62 to read from an external system state, such as from a database page, perhaps in the cache 64. The resource manager 62 performs the read task, constructs a log record for this as a read operation that includes in the logged information the data values read and sufficient information so that the data read can be moved to the appropriate input buffers of the application state. The data is then moved to the application's input buffers and the log record is posted to the volatile log 68 and subsequently to the stable log. The return parameters of the read (i.e. the parameters that do not modify application state until control is returned to the application) become part of the log record for the next execute operation.

Figure 7:
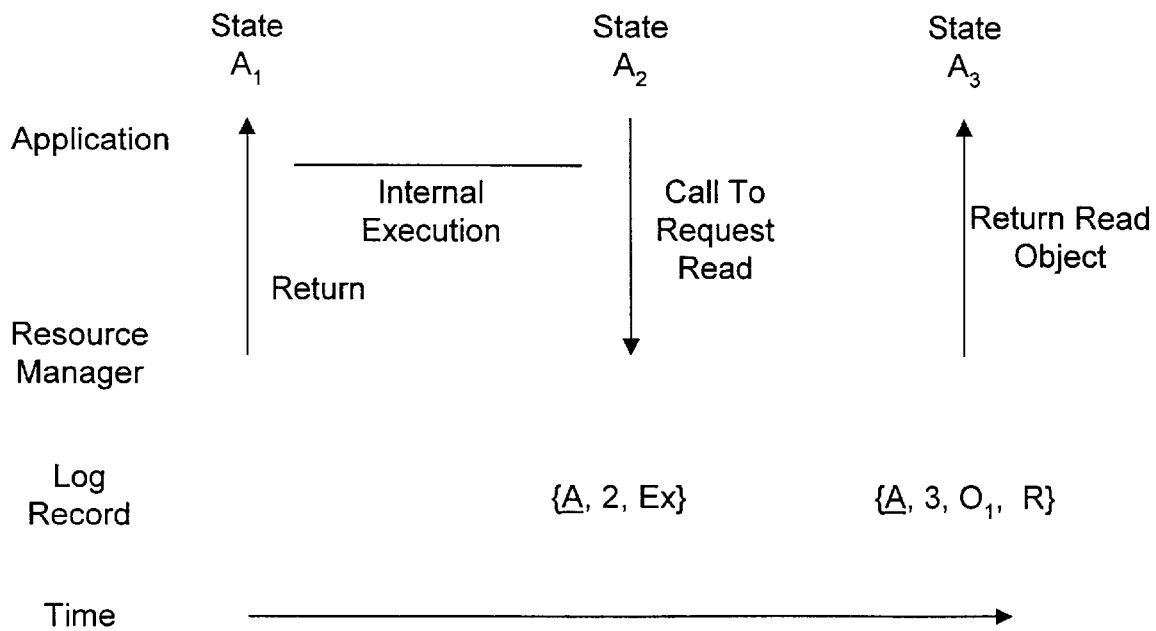
FIG. 7 is a diagrammatic illustration similar to FIG. 6, but showing a logical read operation.

FIG. 7 shows a logical read operation following the execute operation described above with respect to FIG. 6. Suppose that the call made by the application to the resource manager at state $A_2$ is a call for a read task. The resource manager performs the read task and returns the values read from the object to the application. This return creates a change in application state to state $A_3$. The resource manager logs the application identifier A and state identifier 3, the value of object $O_1$, and the read operation R resulting in the application state $A_3$. Thereafter, the log manager writes this log record to the volatile log and subsequently posts it into the stable log.

5. Write: The application 60 calls the resource manager 62 to write to external system state, such as to a database page that might already be in a buffer in cache 64. The resource manager 64 performs the write, logs the values written O.Val and the identity of the object O written in the log record in the volatile log 68. Any return parameters become part of the log record for the following execute operation.

Figure 8:
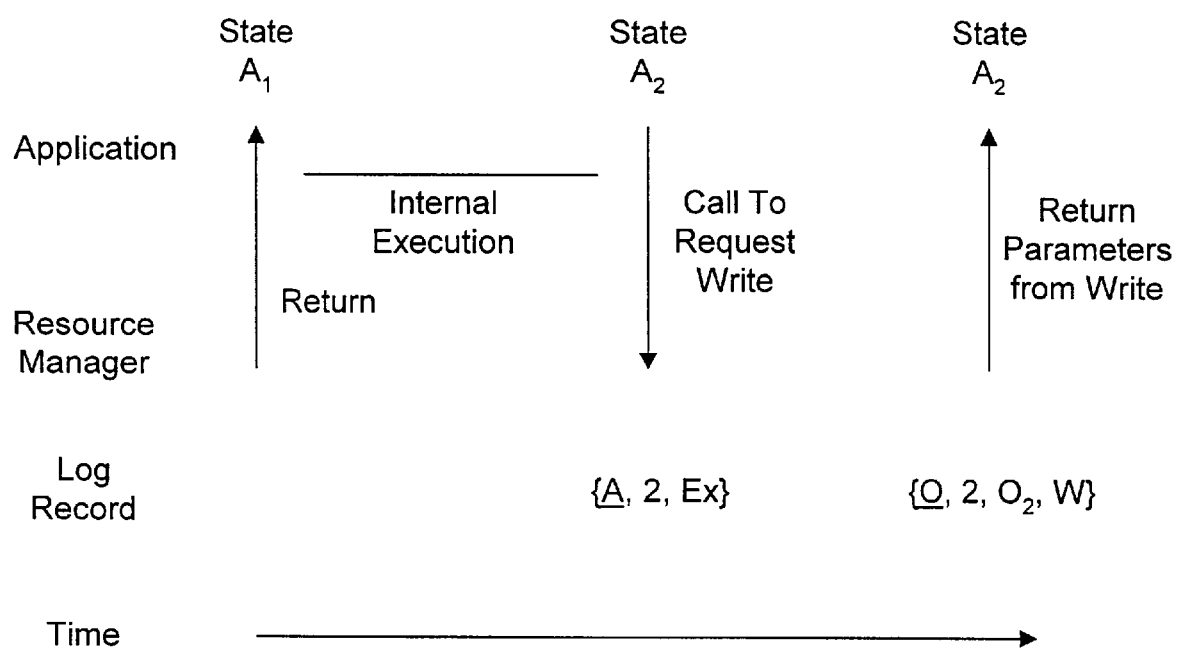
FIG. 8 is a diagrammatic illustration similar to FIG. 6, but showing a logical write operation.

FIG. 8 shows a write operation following the execute operation describe above with respect to FIG. 6. Suppose that the call made by the application to the resource manager at state $A_2$ is a call for a write task. The resource manager performs the write task, logs the object identity O, its state ID 2, the values written $O_2$, and the write operation W that results in the object state $O_2$. The resource manager then returns any parameters resulting from the write task to the application. These return parameters are part of the input to the next execute operation.

One benefit of mapping the application execution into loggable operations is that these operations can be expressed entirely in terms of the application states. For the execute operation, for example, the application begins in one state and is transformed to another state by internal executions of the application. To the outside world, the execute operation can therefore be expressed as reading a first application state before the internal executions, and writing a transformed application state resulting from the internal executions. Table 1 shows the application operations characterized in terms of application states.

TABLE 1

| Logical Operation | Expressed as Read/Write of Application State |
|---|---|
| Execute Ex(A) | Read application state, write application state. |
| Initiate In(A) | Write application state from the static state retrieved from stable memory. This writes the application invocation state instance. |
| Terminate T(A) | Write final application state. |
| Read R(A) | Read application state, write application state with read object data values that are included in the read log record. |

TABLE 1-continued

| Logical Operation | Expressed as Read/Write of Application State |
|---|---|
| Write W(O) | Writes do not effect application state. However, an application write transforms the written object from one state to another by overwriting its prior value with the after-image value stored in the write log record. Accordingly, a write operation writes data object state. |

It is noted that there may be interactions that cannot be mapped into these five operations. For example, reading a message may consume the message as well; i.e. the application writes to the message queue by removing the message. This interaction is both a read and a write that cannot be optimized as above.

Figure 9:
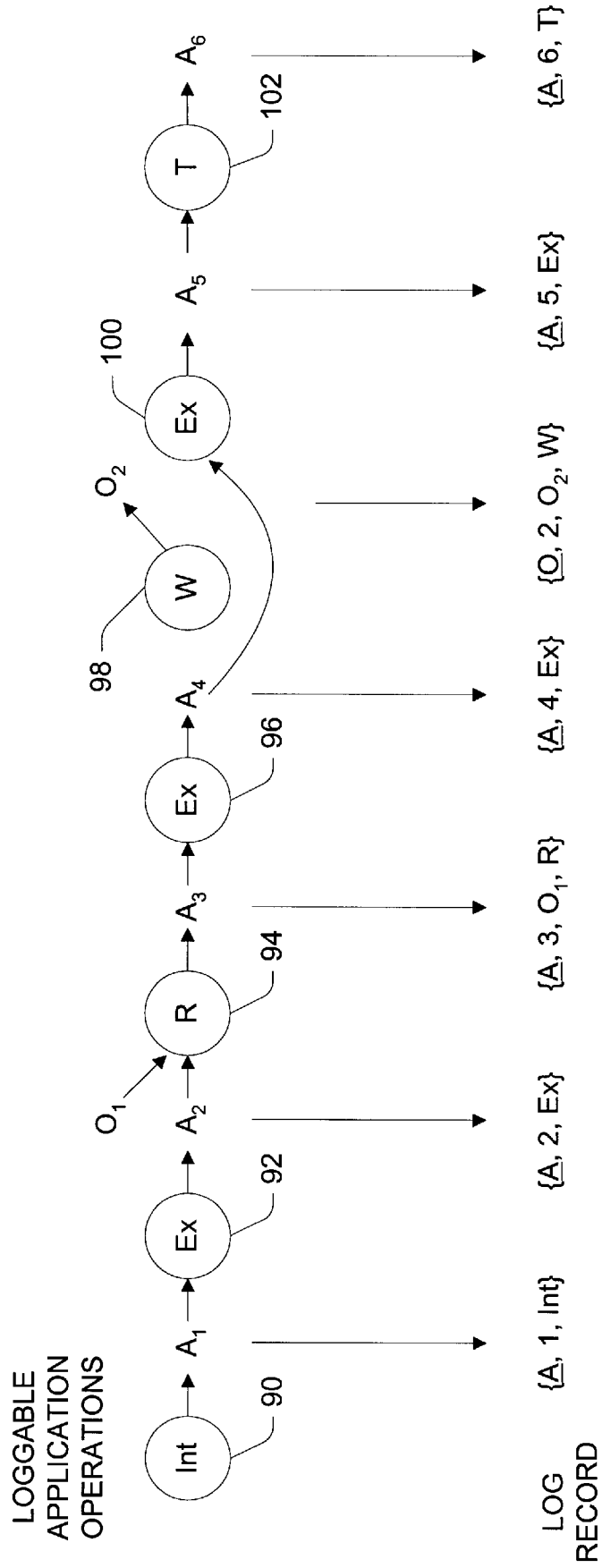
FIG. 9 is a diagrammatic illustration showing a sequence of logical application operations and how the operations are logged.

FIG. 9 shows an example series of loggable operations that are mapped from application executions. The loggable operations are designated by a circle: the legend "Int" within a circle stands for an initiate operation; the legend "Ex" within a circle represents an execute operation; the legend "R" within a circle stands for a read operation; the legend "W" within a circle represents a write operation; and the legend "T" within a circle stands for a terminate operation.

The initiate operation 90 writes the initial application state $A_1$. The resource manager includes in a single log record an application identity A, its state ID 1, and the name of the operation Int. The log record is written in the volatile log and subsequently posted to the stable log.

An execute operation 92 reads the application state $A_1$, performs some internal executions, and writes the application state $A_2$ by means of the application executing beginning in at state $A_1$ and the execution resulting in state $A_2$. The resource manager logs the application identifier A, a state ID 2, and the execution operation Ex that resulted in the application state $A_2$.

A read operation 94 reads the application state $A_2$ and an object $O_1$. As above, the shorthand notation "$O_1$" means an object with an identifier O taken at a state ID "1." The object value $O_1$ is read into the application buffers and results in a next application state $A_3$. The resource manager logs the application identifier A, its state ID 3, and the read operation R that resulted in the application state $A_3$. In addition, the resource manager includes the object value $O_1$ in the log record. Writing the values read from the object into the log record ensures that the values are available for redo of the application operations during recovery in the event that the object O has been subsequently updated and a subsequent value flushed to the stable database.

Unfortunately, in some cases, the values read from the object O can be large and hence logging the entire object value is not desirable. Moreover, the log record containing the object values is separate from, and often duplicative of, the data pages holding the object $O_1$ which are occasionally flushed to the stable database. The system and methods described herein address this problem by optimizing the read operation to reduce the amount of data placed on the log. This optimization involves development of a new cache manager, a topic that is discussed below with reference to FIGS. 10–14 in more detail.

An execute operation 96 transforms the application state from state $A_3$ to state $A_4$. The resource manager logs the application identifier A, a state ID 4, and the execution operation Ex that resulted in the application state $A_4$.

A write operation 98 writes a modified version of the previously read object, designated as $O_2$. The resource manager logs the object identifier O, its state ID 2, the value $O_2$ written, and the write operation W that resulted in object state $O_2$. This ensures that the write parameters are available on the log for redo of the application operations during recovery in the event that the object $O_2$ is not flushed to the stable database.

Similar to the read case, the value $O_2$ can be large and duplicated elsewhere in the system, and thus logging the entire object value is not desirable. The system and methods described herein address this problem by optimizing the write operation to avoid logging the value of O, by logging the application state that provided the data value for O. This write optimization involves development of a new cache manager, a topic that is discussed below with reference to FIGS. 15–23 in more detail.

An execute operation 100 transforms the application state from state $A_4$ to state $A_5$. The resource manager logs the application identifier A, a state ID 5, and the execution operation Ex that resulted in the application state $A_5$.

A terminate operation 102 writes the final application state $A_6$. The resource manager writes in a log record the application identifier A, a state ID 6, and the termination operation T that resulted in the application state $A_6$.

The changes to the application during these operations are accumulated in the application state stored in the volatile cache. From time to time, the cache manager flushes the application state to stable storage. The flushed application state is tagged with a state ID. The flushing of the application state effectively installs all application operations which have been logged in the stable log that have a state ID less than the state ID of the flushed application state.

General Recovery

Following a system failure, the database computer system invokes a recovery manager 71 to recover the data pages (and other data objects) and application state lost during the crash. During redo recovery, the recovery manager 71 retrieves the most recently flushed data objects and application objects in the stable database and replays the operations in the log against the stable objects. The recovery manager 71 can be implemented as a conventional recovery manager which replays the stable log, beginning at a point known to be earlier than the oldest logged operation that was not yet installed. The recovery manager compares the state ID of each logged operation in the stable log with the state ID of a retrieved data object or application object. If the state ID of the logged operation is later than the state ID of the stable object, the recovery manager redoes that logged operation. This redo process returns the database computer system to the previous state in which it was operating immediately prior to the crash, including the recovered applications.

Another aspect of this invention involves techniques to optimize recovery to avoid replaying operations that are rendered obsolete by subsequent operations. In this case, the recovery manager is implemented to handle the recovery optimization techniques, as is described in more detail below with reference to FIG. 24–27.

Read Optimization

In the recovery scheme described above, the read operation involves writing all of the contents read from the object to the stable log in association with the read operation. The logged operation can then described as reading and writing application state. This type of operation, in which only a single object is written, and at most that object is read, is referred to as a "physiological operation." These operations are useful in that using only such operations, recovery can be implemented using conventional cache managers and cache management techniques. The cache manager need not be concerned about object flushing sequence or preserving a certain object state because any data value obtained from an object which was read, and hence which is needed to redo an application operation is available directly from the stable log.

The benefits accruing to cache management as a result of logging only physiological operations come at a cost. Treating an application read as a physiological operation requires writing data, and often large amounts of data, to the stable log. This reduces efficiency in the logging process and consumes I/O resources. Moreover, the data written to the stable log is a copy of data in an object, which is maintained in volatile cache and occasionally flushed to the stable database. It is wasteful to duplicate large data objects in log records when these objects are available elsewhere.

Accordingly, an aspect of this invention is to optimize the logged read operation to avoid writing the object's data to the log record. Generally, the optimizing technique eliminates logging the read values by substituting, for the read values, names of the objects from where the values are read in the log record. That is, rather than logging the object value that is read, the read optimization technique involves logging the identity of the object that is the source of the values being read. We call this a "logical read" and denote it by R(A,O), indicating that application A reads data object O for the input value needed to transform application A's state; it does not get this input value from the log record. For instance, a log record for the logical read operation includes the application object's identifier A, its state ID, A.SID, the data object's identifier O, the data object's state ID, O.SID, and an indication that a read operation was performed:

<A, A.SID, O, O.SID, R>

Other information may also be included, such as an index to a specific value set contained in the object. Posting information that names the source of a data value, rather than the value itself, substantially reduces the amount of information placed on the stable log. When redoing a logged operation during recovery, the recovery manager 71 uses the object name to locate the object and reads the value from that object.

Unfortunately, substituting object names for the actual values comes at a cost of introducing dependencies between the objects in the cache. Attention must now be paid to the order in which objects are flushed to stable storage. If objects are flushed out of proper sequence, a particular state of an object may be irretrievably lost. An object name contained in a logged operation would not enable restoration of the object values needed by the operation if the data value for the object is not the same as the value that was originally read from the object during normal execution.

Figure 10:
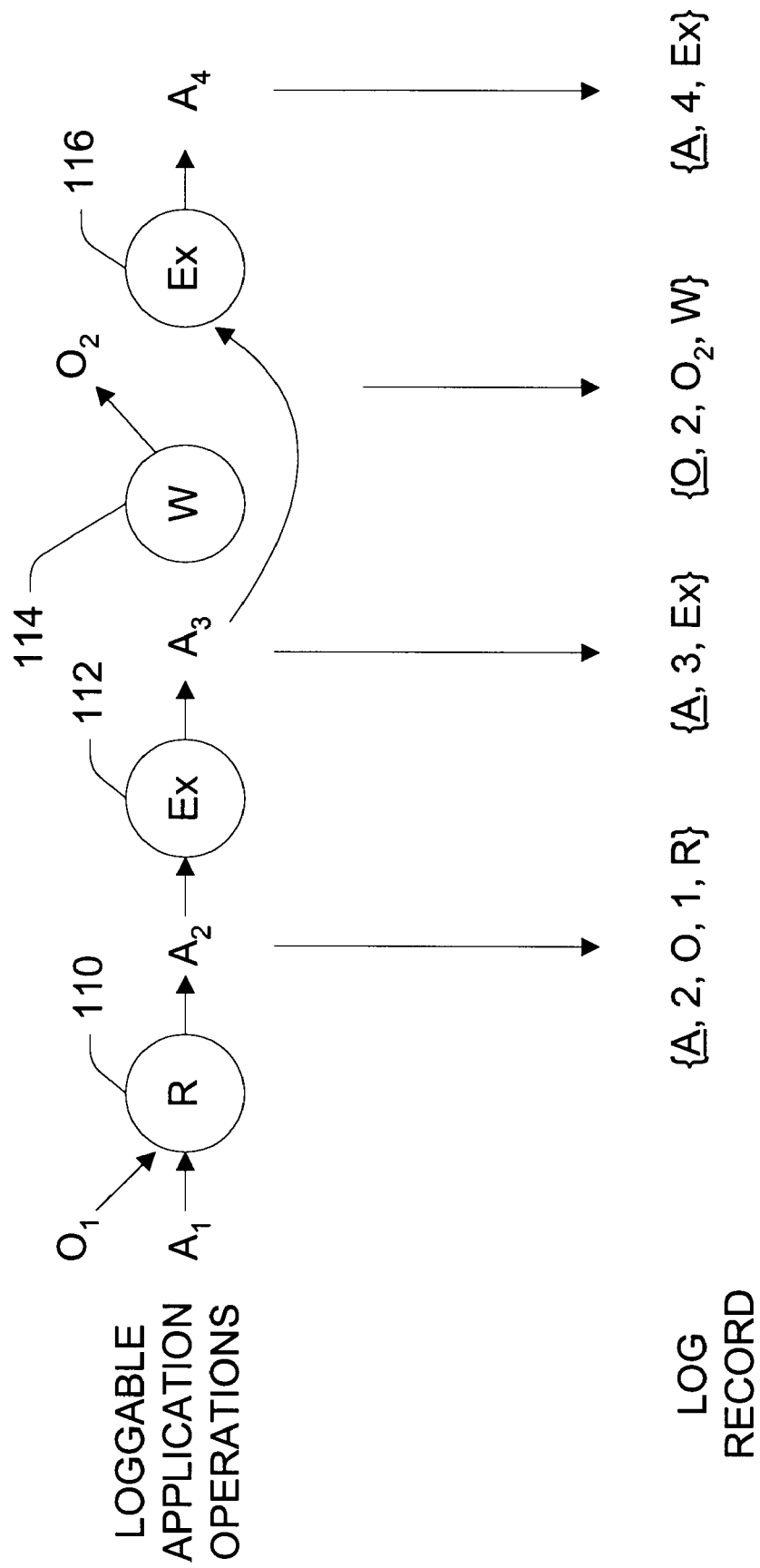
FIG. 10 is a diagrammatic illustration of the sequence of operations from FIG. 9, which shows a read optimizing technique for logging operations and objects affected by read operations.

FIG. 10 illustrates the dependency issue introduced by the read optimization technique. FIG. 10 shows a sequence of operations comprising a read operation 110, an execute operation 112, a write operation 114, and an execute operation 116. These operations are identical to the operations 94–100 in FIG. 9. However, unlike the procedure in FIG. 9, the value of the object that is read at operation 10 is not posted to the log. Instead, only the object identifier O and state ID are posted. The object identifier and state ID identify the exact data value needed by the logged operation.

The operation sequence in FIG. 10 introduces a dependency between the application object A and the data object O. Assume, for example, that the cache manager flushes the data object O to stable memory at state $O_2$ after the write operation 114 without having previously flushed the application object A to install the operations 110 and 112 preceding the write operation 114. Then, before the cache manager has an opportunity to flush the application object A, the system crashes. Upon replay of the log, the computer database system is unable to redo the operations to resurrect the true application states $A_2$–$A_4$ because the object state $O_1$ is not available. That is, the stable database only contains the flushed object O at state 2, not at its initial state 1.

(Note that we do not describe the write 114 as reading application state $A_3$. Rather, write 114 is a physical write that gets the value written as $O_2$ from the log record. This avoids additional flush dependencies.)

This dependency is explained in the context of an installation graph as a "read-write edge." That is, the write operation writes data into a read variable set which is read in an operation preceding the write operation, thereby overwriting needed data to carry out the read operation during recovery. Installation graphs and the read-write edge case are described in detail in a publication by David B. Lomet and Mark R. Tuttle, entitled "Redo Recovery after System Crashes," *Proceedings of the 21st VLDB Conference*, Zurich Switzerland, 1995. This publication is incorporated by reference.

To manage dependencies, the database computer system is equipped with a cache manager that is attentive to flushing sequence. The cache manager is designed to ensure that an application object is flushed to stable memory, thereby installing its operations, before any modified data objects from which the application has read are flushed to stable memory. The cache manager implements an object table which tracks active objects in the volatile cache, and monitors flush order dependencies between those objects.

Figure 11:
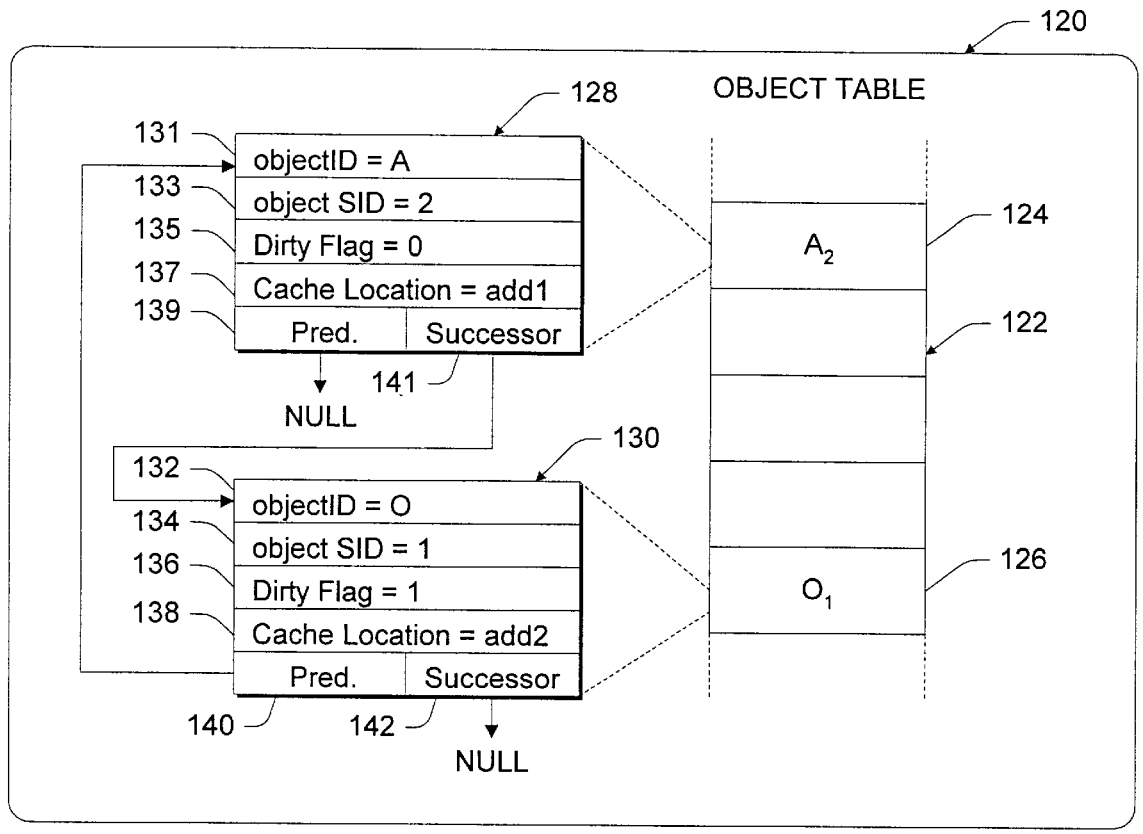
FIG. 11 is a diagrammatic illustration of a cache manager with an object table for tracking dependencies between data and application objects.

FIG. 11 shows a cache manager 120 with an object table 122. The object table 122 holds a list of objects that are presently stored, in the volatile cache or that have flush dependencies with objects presently stored. These objects may be in the form of application objects or data objects. Typically, the data objects have volatile (i.e. cache) locations that arc identified as memory pages. With regard to data objects, the object table 122 is similar to prior art "page tables." However, unlike prior art page tables, the object table 122 also maintains a list of application objects, with each application object comprising the application address space, and information with each entry that is used to manage flush dependencies.

The object table 122 shows an entry 124 for the application object A and an entry 126 for the data object O which reflect respective object states following the read operation 110. These entries contain information pertaining to the objects which is organized in data structures 128 and 130. Each data structure has an object identifier field 131, 132 to hold the object identifier (e.g., A or O), a state identifier field 133, 134 to hold the state ID for the value of the object, a dirty flag field 135, 136 which holds a flag bit indicating whether or not the object has been modified in volatile cache without those modifications being flushed to stable memory, and a cache location field 137, 138 to hold an address to a location in volatile cache where the current cached value of the object physically resides. The data structure may further have a stable location field to hold an address of the object in stable memory, although this field is not shown in this example. Alternatively, the stable location may be derivable from the object identifier, objectID, in field 131, 132.

Each data structure 128, 130 also has a predecessor field 139, 140 to hold information for any predecessor object. An object is a "predecessor object" to a subject object if that object must be flushed prior to flushing the subject object.

The predecessor field 139, 140 enables the object table 120 to track dependencies between the operations. For the read operation, the dependency cases can be resolved into two rules: (1) only an application object can be a predecessor; and (2) an application object has no predecessor. The underlying reason for these rules can be better understood with a brief introduction to a "write graph," which is a graph derived from an "installation graph," and is described in the above incorporated article by Lomet and Tuttle.

Figure 12:
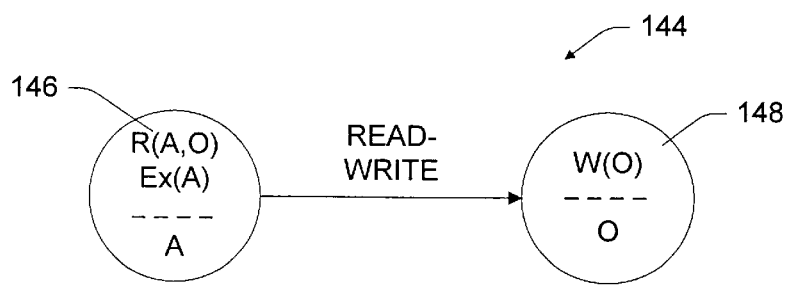
FIG. 12 is a write graph that illustrates a read-write dependency between an application object and a data object.

FIG. 12 shows a write graph 144 for a read-write edge in which a read operation reads a data object O at a first state during execution of the application object A, and subsequently a write operation writes the data object O to create a second state of that data object. In write graph notation, the circles represent nodes. A write graph node n is characterized by a set of operations ops(n) and a set vars(n) of variables (i.e., objects) written by the operations in ops(n). There is an edge between write graph nodes m and n if there is an installation graph edge between an operation in ops(m) and an operation in ops(n). The cache manager installs the operations of ops(n) by flushing the objects of vars(n) atomically.

Write graph 144 has two nodes, an application node 146 with vars(146)={A} and a node 148 with vars(148)={O}. The application node 146 shows that the read operation has been performed which changes the application state (by reading values into the application buffers) and that the application has continued its execution with an Ex(A) operation. The data node 148 shows that the write operation affects the object state.

Write graph 144 demonstrates a flush order dependency between the application object and data object. To ensure correct recovery of the application, the cache manager flushes the application object represented by node 146, thereby installing the read operation, prior to flushing the data object represented by node 148.

This write graph further illustrates that, for a logical read operation, an application object A has no predecessor for which it is concerned. All paths between nodes 146 and 148 are at most a length of one. Only the data object O has a predecessor and that predecessor is the application object A (which read it). The logical read operation, by itself, thus reduces to a straightforward result. With reference again to FIG. 11, the predecessor field 140 denotes a list of predecessors for the object O entry 130. The predecessor entry shown contains the identifier for the application object A data record 128, denoted as the predecessor object PO. This predecessor is established when the read operation 110 (FIG. 10) is encountered. The predecessor entry also includes a state identifier for the originating object O, i.e., O.SID. That is, in the general case, an entry on the predecessor list is represented as:

<O.SID, PO>

It is noted that a data object may have more than one predecessor. Hence, the predecessor field 140 may contain a set of entries for multiple predecessor objects.

Since FIG. 11 illustrates a read operation, the application object has no predecessor. As a result, the predecessor field 139 for the application A data structure 128 contains a null pointer, denoting the empty list.

Each data structure 128, 130 further includes a successor field 141, 142 to hold information for any successor object. An object is a "successor object" of a subject object if the subject object must be flushed before the successor object is flushed. The successor field 141, 142 is primarily used as a bookkeeping function, to track successor objects, as it adds no additional information that is not already contained in the predecessor field. When flushing an object, the cache manager ensures that all real predecessors are flushed beforehand. After flushing, the cache manager uses successors only to clean up by removing the flushed object as a predecessor in other predecessor lists. Less information is needed for successors, for example, object state ID, O.SID is not needed. The cleanup is unconditional, taking place regardless of whether the predecessor/successor is real or potential. It is noted, however, in an alternative implementation, the successor field may be primarily relied upon, with the predecessor field serving a secondary bookkeeping role.

The first statement of the read operation is that only an application object can be a predecessor. The converse to this statement is that only an application object can have a successor. In FIG. 11, the successor field 141 of the application A data structure 128 contains an entry for the object O data record 130. The successor entry is established when the read operation 110 (FIG. 10) is encountered. The data object O has no successor. As a result, the successor field 142 for the object O data structure 130 contains a null pointer indicating an empty list.

Through the predecessor and successor fields in the object table, the cache manager 120 tracks dependencies between the objects. When the cache manager 120 decides to flush an object to stable memory, the cache manager first checks the object table 122, and particularly, the predecessor field of the object entry to determine whether or not the object to be flushed has any predecessors. If a predecessor is listed for that object, the cache manager will flush the predecessor object, assuming it is "real," prior to flushing the subject object.

The cache manager 120 distinguishes between "real" and "potential" predecessors. A "real" predecessor object is one that has read an object whose state has been changed by subsequent operations since the time the object was read by the predecessor. A real predecessor must be flushed prior to the subject object to ensure retention of a correct state in the stable database. In contrast, a "potential" predecessor object is one that has read an object whose state has not changed since the time the object was recorded as a predecessor. A potential predecessor does not require priority flushing, although the cache manager continues to track potential predecessors because they may turn into real predecessors. These arc tracked by retaining object table entries for objects with predecessors, even if they themselves are flushed and their values removed from the cache.

FIG. 10 demonstrates the difference between real and potential predecessors. At the read operation 110, the cache manager updates the predecessor list for the data object O in the object table to reflect that the application object A is a predecessor. At this point, however, application object A is only a "potential" predecessor because object O's value is still the same. Hence, application object A does not require flushing prior to the data object O as the same application state can be recovered from re-reading data object O.

However, at the write operation 114, the predecessor becomes a "real" predecessor. Here, the data object O is modified by the write operation 114, thus changing the state of O that the application object A read previously in the read operation 110. Now, application object A needs to be flushed prior to the data object O, or else application object A will not be restored to the same application state during recovery because the state 1 of data object O is irretrievably lost.

The cache manager determines whether a predecessor is "real" or "potential" by comparing the current state identifier of the object to be flushed against the state identifier of the same object as recorded in the entry of the predecessor list. For example, suppose the cache manager 120 decides to flush data object O following the execute operation 112 (FIG. 10). The cache manager compares the current state ID of the data object O, which is still state 1 at that point, with the state ID recorded in the entry for the predecessor application object A contained in the predecessor field 140. In this case, object O's state ID in the entry is also 1. The state IDs match and thus, the application object A is only a potential predecessor at this point. The cache manager is free to flush the data object O at this point without first flushing application A. The predecessor entry for application object A is maintained, however, in the predecessor field 140 of the object O entry 128.

Now, suppose that the cache manager decides to flush the data object O following the write operation 114 (FIG. 10). The cache manager compares the current state ID of the data object O, which is now state 2 following the write operation, with the state ID recorded in the entry for the predecessor application object A contained in the predecessor field 140. As before, the object state ID in the entry is 1. The state IDs no longer match. Thus, the application object A has now become a real predecessor. When faced with a real predecessor, the cache manager must first flush the predecessor, in this case the application object A, prior to flushing the data object O. Flushing the application object A effectively installs all of the operations (which in the example, all update application A) through the write operation 114 (which accounts for the new object state $O_2$).

Once the application object A is flushed, the predecessor entry contained in the data object O's predecessor list 140 is removed. The cache manager deletes the predecessor entry from the predecessor list 140. Since application object A may also be a predecessor for other objects, the cache manager uses the application object A's successor list 141 to inform any successor data objects (including data object O) that application object A has been flushed and is no longer a predecessor to them.

When an application terminates, the cache manager scans the successor field 141 of the application object A to remove from the predecessor field of successor objects any entries to the terminated application.

Figure 13:
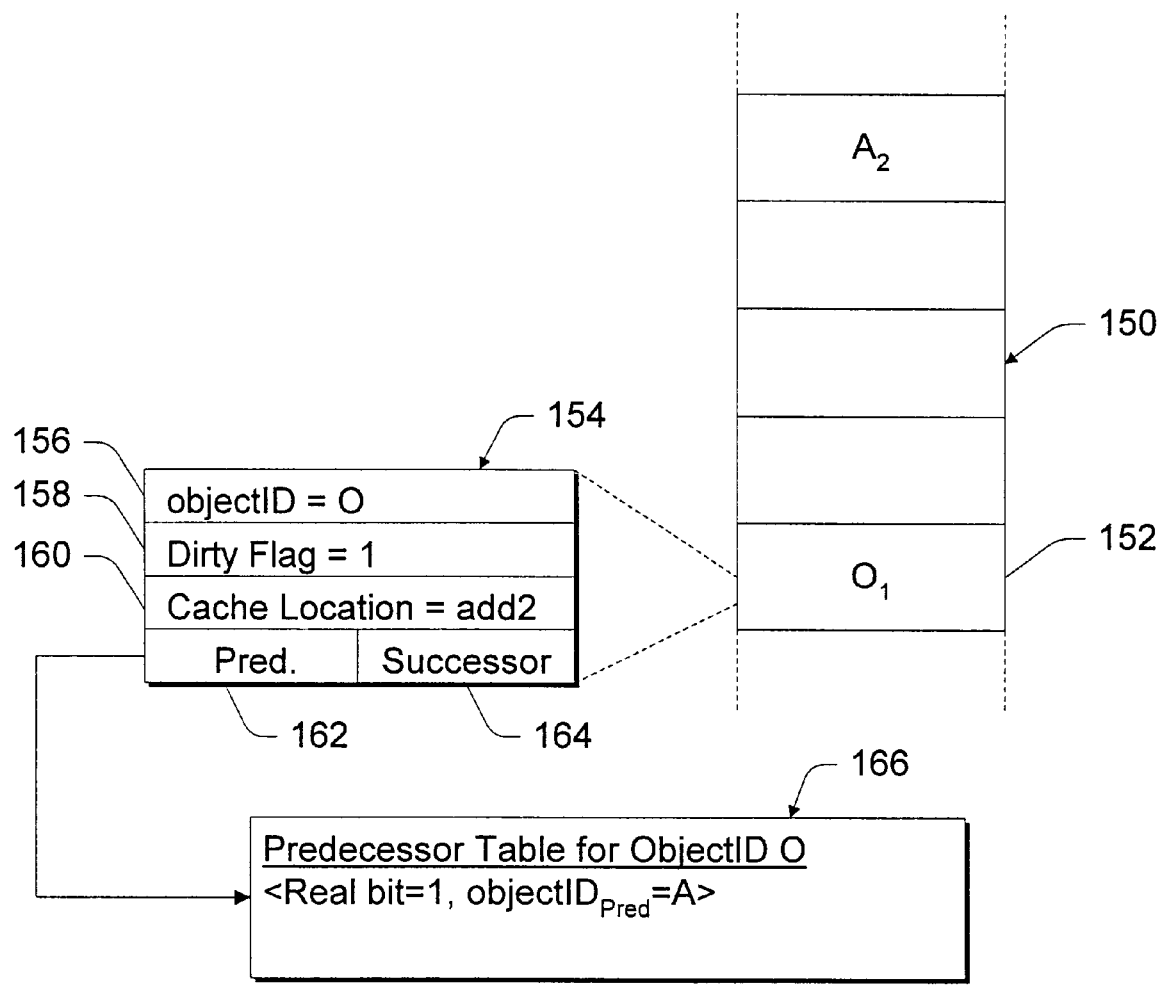
FIG. 13 is a diagrammatic illustration of a cache manager with an object table constructed according to yet another implementation.

FIGS. 13 shows an alternative construction of the object table. In FIG. 13, the object table 150 contains an entry 152 for a data object O at state 1. This entry includes a data structure 154 having an object identifier field 156, a dirty flag field 158, a cache location field 160, a predecessor field 162, and a successor field 164. In data structure 154, the predecessor field 162 contains an index to a separate predecessor table 166.

For each predecessor object, the predecessor field 162 contains a unique index to an entry in the predecessor table 166 containing information used to identify and locate the predecessor object. In this example, the entry in the predecessor table 166 contains a real bit and an object identifier of the predecessor (i.e., objectID$_{Pred}$=A). The real bit which is set (i.e., to a binary value 1) if the predecessor object is a "real" predecessor and is reset (i.e., to a binary value 0) if the predecessor object is a "potential" predecessor. When the cache manager decides to flush the data object O, the cache manager no longer compares state IDs to determine whether a predecessor is real or potential. Instead, the cache manager examines the real bit. If the real bit is set, the cache manager knows it must flush the associated predecessor object before flushing the subject object. The "real" bit is initialized to zero when an object O is read by an application. At the time that the object O is subsequently written, all current potential predecessors (which have real bit set to zero) have this bit set to one.

The read optimization techniques described in this section are beneficial because they eliminate having to post the values obtained during a read operation onto the log. Instead, the log only contains information to identify the object that was read. While this reduced the amount of data to be logged, the read optimization techniques introduced flush dependencies between objects. The cache manager thus keeps an object table which tracks dependencies to ensure a proper flushing order.

Write Optimization

In the general recovery scheme introduced at the beginning of this detailed disclosure, a write operation involves posting, to the stable log in association with the write operation, all of the values that are written to an object. The logged operation can be described as simply writing the object state of a data object. This yields a physiological operation that can be handled using conventional cache managers and cache management techniques. The conventional cache manager need not be concerned with object flushing sequence or preserving a certain object state because any data value written to an object, and hence is needed during recovery, is available directly from the stable log.

However, the data values written to the stable log are duplicative of values in the application object's output buffers. Thus, the logging effort is inefficient and computationally expensive.

Accordingly, an aspect of this invention is to optimize the logged write operation to avoid posting the written values to the log record. Generally, the write optimizing technique eliminates logging the written values by logging the identity of the object from where the values are obtained, along with its state ID. Posting information that names the source object and its state ID, rather than the values themselves, substantially reduces the amount of information placed on the stable log. Such writes are called "logical writes," and are denoted by W(A,O) indicating that application A is writing data object O. A logical write operation results in the posting of a single log record to the stable log, wherein the log record contains the data object identifier O, the data object O's state ID, O.SID, the application object identifier A, its state ID, A.SID, and an indication that a write operation W was performed:

<O,O.SID,A,A.SID, W>.

At recovery, operations on that source object (typically, an application object) are replayed to its state at the time of the execution of the write operation. The regenerated application state inherently includes the state of the output buffers needed to replay the write operation. Hence, logging the after-image of the data object resulting from the write can be avoided.

Figure 14:
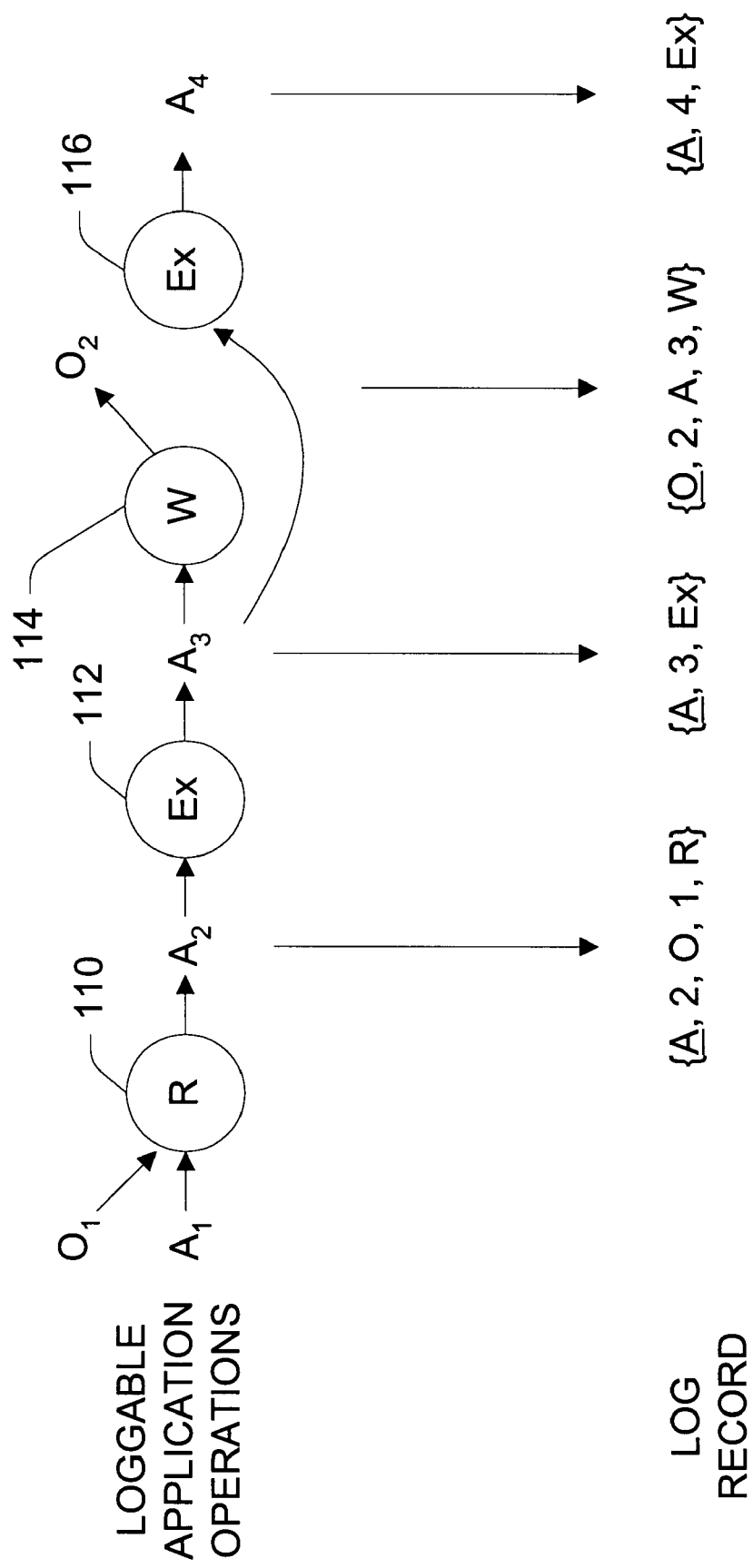
FIG. 14 is a diagrammatic illustration of the sequence of operations from FIG. 10, which shows a write optimizing technique for logging operations and objects affected by write operations.

FIG. 14 shows the sequence of operations identical to FIG. 10, including the read operation 110, the execute operation 112, the write operation 114, and the execute operation 116. The write operation 114 involves reading application state $A_3$ and writing data object state $O_2$. Unlike FIG. 10, however, the value written to object O (i.e., $O_2$) at the write operation 114 is not posted to the log. Instead, the cache manager logs the identify of the data object that is written (i.e., O), the data object's state ID 2, the identity of the application object A which is the source of the values written, object A's state ID 3, and the write operation W which results in object state $O_2$. Posting these objects' identities consumes much less memory and fewer I/O resources than posting the entire value of the object state $O_2$ to the stable log. The application object identifier A and its state ID identify the exact data value needed by the logged write operation.

The write optimization technique comes at the expense of introducing more flush order dependencies to ensure proper installation of operations. In the read optimization case described in the preceding section, flush order dependencies are comparatively easy to handle. The dependency chain is at most one link in length. The application state in a read dependency has no predecessors, and hence nothing ever needs to be flushed before the application state itself. When the cache manager decides to flush an object, it flushes all predecessor objects (i.e., any predecessor application objects) and then the subject object. The read dependencies are thus "acyclic," meaning that each object can be flushed atomically independently of other objects in a prescribed order, without requiring the simultaneous atomic flushing of multiple objects.

Unfortunately, flush dependencies arising from write operations, when combined with dependencies arising from read operations, can result in "cyclic" flush dependencies. This means that an object that is both read and written by an application must be flushed both before (actually, not later than) and after (actually, not earlier than) the application object. Cyclic flush dependencies require atomically flushing both the data object and the application object simultaneously, which presents significant complications.

Figure 15:
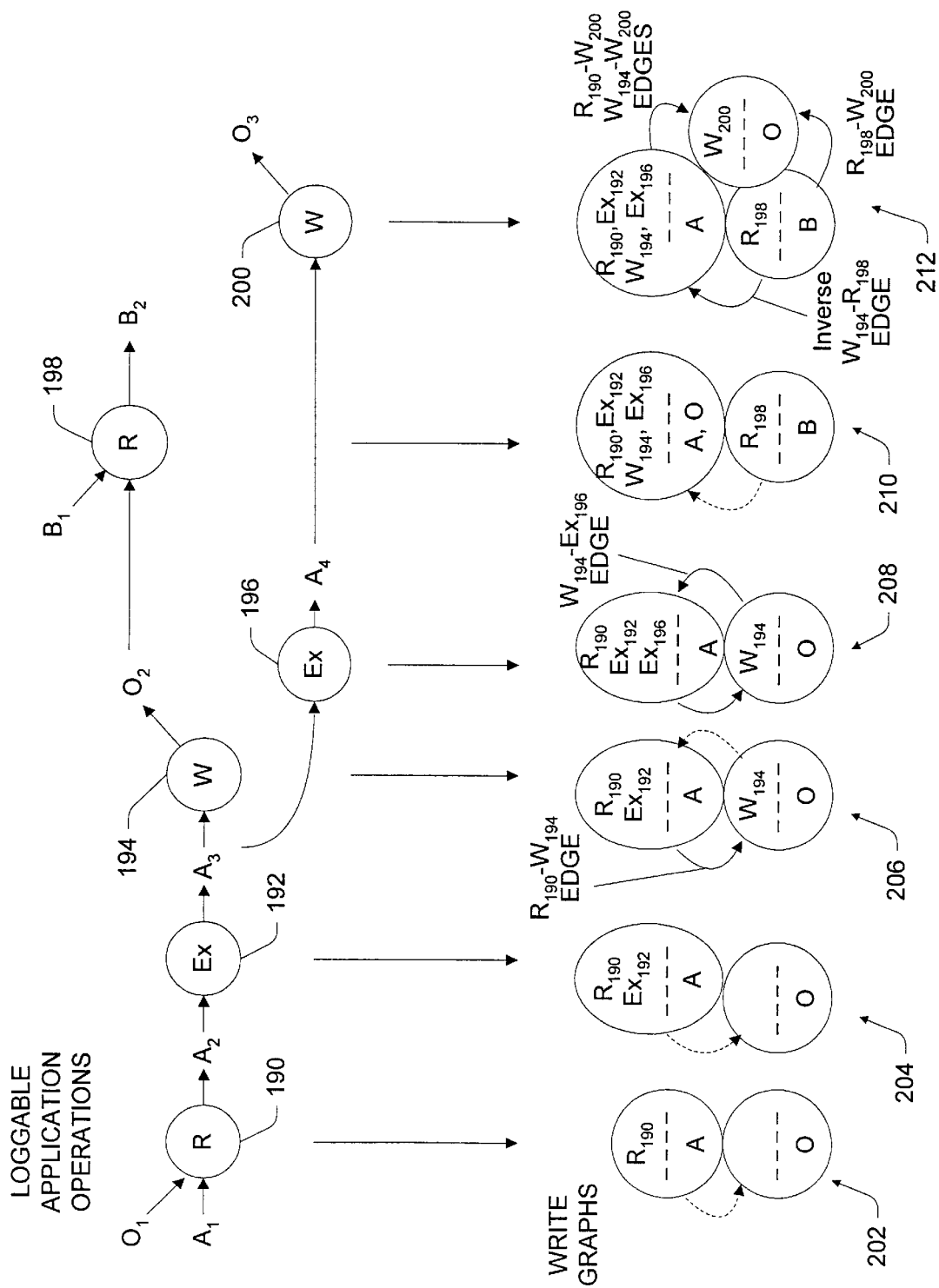
FIG. 15 is a diagrammatic illustration showing a sequence of logical application operations and corresponding write graphs.

FIG. 15 illustrates a cyclic dependency introduced by the write optimization technique. FIG. 15 shows a sequence of operations and how the operations are represented as write graphs. The sequence of logical operations includes a read operation 190, an execute operation 192, a write operation 194, an execute operation 196, a read operation 198, and a write operation 200.

Corresponding write graphs 202–212 are provided below each operation. The write graphs consist of nodes. Each node n identifies a set of uninstalled operations (i.e., the abbreviations above the dotted line within the nodes), denoted ops(n), in correlation with a set of data or application objects written by the operations (i.e., the abbreviations below the dotted line within the nodes), denoted vars(n). The cache manager usually sees the operations in serialization order. Including the operations in the write graphs in that order is fine because serialization is stronger than installation order.

At the read operation 190, the corresponding write graph 202 consists of a node containing application object A. The read operation 190 reads application state $A_1$ and data object state $O_1$ and writes application state $A_2$. This is reflected in the write graph 202 as involving two nodes: one node containing the application object A and one node containing the data object O. The read operation is registered in the node containing the application object A because the operation writes the application state. The notation $R_{190}$ (i.e., read operation 190) in the node containing the application object A indicates that the read operation writes object A. No operation is placed in the node containing object O, because the read operation does not write the object state.

When a new operation occurs, the operation is added to the write graph as follows:
1. Merge into a single node m all nodes n for which vars(n) intersect (write(Op) intersect read(Op)) is not null, where write(Op) is the set of variables written by operation Op, and read(Op) is the set of variables read by Op.
2. If the resulting graph has a cycle, collapse each strongly connected region of the graph into a single node. Each such node n has ops(n) that equals the union of ops(p) of nodes p contained in its strongly connected region and vars(n) that equals the union of vars(p).
3. For each node p≠m, set vars(p)=(vars(p)−nx(Op)). This removes from vars(p) objects that become not exposed, where nx(Op)=write(Op)−Read(Op)
4. To ensure that objects in node p are not exposed when we flush them to install their operations, an edge is defined from each node q with an operation that reads the final version of the object in the node p to node p. Previously, each node p had node q as a potential predecessor.

The read operation 190 introduces a potential read-write edge in write graph 202 from the node containing A to the node containing O. This potential edge (shown as a dashed arrow) indicates that a subsequent write or update of data object O to change its state will create a real edge, thereby establishing a flush order dependency between objects A and O. The direction of the arrow represents the flushing sequence in the flush order dependency. The arrow points from the node containing object A to the node containing object O (i.e., A→O) to represent that the application object A must be flushed before the data object O.

The execute operation 192 reads the application state $A_2$ and writes the application state $A_3$. The node containing the object A in the write graph 204 is expanded to include the execute operation (i.e., $Ex_{192}$) because the execute operation 196 writes application state $A_3$. The node containing object O remains void of any operations.

The write operation 194 reads application state $A_3$ and writes the object state $O_2$. The write operation is reflected in the write graph 206 by placing the notation $W_{194}$ (i.e., write operation 194) in the node containing the data object O. Notice that the write operation 194 does not write the application state, and thus the write operation is not added to the node containing application A.

The write graph 206 also shows a real read-write edge caused by the read and write operations 190 and 194. That is, the previous potential edge has now been converted to a real edge by virtue of the sequence of read-write operations 190 and 194. This read-write edge introduces a flush order dependency between application object A and data object O. To ensure correct recovery of the application, the cache manager must flush the application object A, thereby installing the read operation $R_{190}$, prior to flushing the data object O. The read-write edge is indicated by a solid arrow, the direction of which indicates the flushing sequence in the flush order dependency. Here, the application object A must be flushed before the data object O and thus, the arrow points from the node containing object A to the node containing object O (i.e., A→O).

The write operation 194 also introduces a potential edge in write graph 206 from the node containing O to the node containing A. This potential edge indicates that a subsequent write or update of data object A to change its state will create a real edge, thereby establishing a flush order dependency between objects A and O.

The execute operation 196 reads application state $A_3$ and writes application state $A_4$. Since the execute operation 196 writes application object A, the application node A of the write graph 208 is expanded to include that operation (i.e., $Ex_{196}$). The execute operation 196 does not write the data object state, and thus the execute operation is not added to the node containing data object O.

The execute operation 196 introduces a real dependency between the data object O and the application object A, as indicated by the write-execute edge. This dependency arises because the data object state $O_2$ can only be regenerated from values found in the output buffers at application state $A_3$, which is about to change as a result of the execute operation 196. Since the write optimization technique eliminates logging of the write values to the stable log, the recovery manager must obtain those values from the output buffers of application state $A_3$ to replay the write operation 194.

To ensure correct recovery of the data object O, the cache manager must flush the data object O, thereby installing the write operation 194 which produces state $O_2$, prior to flushing the application object A. The write-execute edge is indicated by the solid arrow pointing from the node containing O to the node containing A, thereby indicating an O→A flushing sequence in the flush order dependency.

Unfortunately, the two dependencies between objects A and O are cyclic (i.e., A→O→A). As shown in the write graph 208, application object A must be installed before data object O (i.e., A→O) to ensure recovery of the application and the data object O must be installed before the application object A (i.e., O→A) to enable replay of the write operation 194. This cycle can only be handled in full by flushing both objects A and O simultaneously and atomically. This poses a problem.

To break such cycles, the cache manager 66 assumes an active role by timely introducing "blind writes" that effectively preserve the state of data object on a log record. In a blind write operation, the current value of the data object O is written to the log in a manner similar to the general unoptimized write case discussed earlier in this disclosure. The blind write leaves the value of data object O unchanged, but writes an after-image of its value on the stable log. As a result, the data object O can be regenerated from this log record, rather than relying on regeneration of a specific state of the application object A.

Accordingly, the dependency cycle is broken. This enables an ordered flushing sequence of first flushing the application object A and then flushing the data object O. That is, once the cycle is broken, the cache manager can atomically flush objects one-by-one, rather than having to flush multiple objects simultaneously and atomically.

The way the cache manager identifies cycles and actively imposes blind writes is best understood in the context of the write graphs. The process, as it pertains to write graphs, involves three general steps. Also introduced is the "intermediate write graph," which is the graph formed before the cycles are collapsed.

1. Add each new operation to the intermediate write graph, either including it in a node with existing operations or giving it a node of its own. The intermediate write graph can have cycles.
2. Collapse nodes affected by cycles into a single node n (i.e. all intermediate write graph nodes of the strongly connected region are collapsed into a single write graph node.). The resulting node n has vars(n) consisting of multiple objects.
3. Remove all objects, but one, from the single node. This reduces vars(n) to containing a single object that needs to be flushed in order to install the operations of the node n. The removal of objects can be accomplished through normal write operations, or through a series of blind writes.

These three steps result in a new write graph containing nodes p with vars(p) having a single variable that can be flushed by itself. The edges connecting these nodes impose an order to the flushing of the objects, but the need to atomically flush multiple objects is removed.

Step 1: Build the Intermediate Write Graph

The intermediate write graph is constructed by the cache manager 66 by performing the following steps for each operation:

1. Identify one or more objects that are both read and written by the operation., i.e. write(Op) intersection read(Op).
2. Intersect the object(s) of step 1 with each set of existing objects associated with a present write graph node n, i.e. objects in vars(n).
3. If all intersections are null, put the operation into its own node.
4. If an intersection is not null, merge all nodes with non-null intersections with the objects of step 1 into a single node.
5. Form edges between intermediate write graph nodes n amd m based on when edges exist between the operations of ops(m) and ops(n) in the installation graph.
6. Remove the objects nx(Op)=write(Op)−read(Op) from vars(p) of any other node that currently contains them.

This method is repeated as new operations are executed and the intermediate write graph is built one operation at a time in operation execution order. A more detailed construction of one exemplary cache manager, and an object table which tracks write dependencies in a manner which effectively handles multi-object nodes and blind write strategies, is described below with reference to FIGS. 18–23.

Step 2: Collapse Intermediate Write Graph Cycles

When a cycle is created, such as the cycle between the nodes containing A and O in the intermediate write graph 208 of FIG. 15, the affected nodes are collapsed into a single node. That is, all intermediate write graph nodes of a strongly connected region are collapsed into a single write graph node. Write graph 210 shows a combined node containing both objects A and O. This combined node contains the union of all operations and objects from the original two nodes. Collapsing intermediate write graph 208 results in the upper node of write graph 210. (The write graph is defined to be acyclic, while the intermediate write graph has cycles.)

Step 3: Reduce Objects In Node to One Object

Forming a combined node containing both A and O has not removed the dependency cycle; rather, both A and O must still be installed atomically together. To break the cycle so that variables can be flushed one by one, all but one object is removed from the node containing multiple objects. This can be done as a result of normal operation, or through a series of blind writes imposed by the cache manager.

With continuing reference to FIG. 15, the read operation 198 involves reading both the data object state $O_2$ and a new application state $B_1$, and writing application state $B_2$. The read operation 198 is reflected in the write graph 210 by addition of a node to contain object B and the inclusion of $R_{198}$ (i.e., read operation 198) in that node. Additionally, the read operation 198 introduces a potential read-write edge from the node containing B to the node containing A, O. This potential edge indicates that a subsequent write or update of data object O to change its state will establish a flush order dependency between objects B and O in which the read operation 198 must be installed (by flushing object B) before installation of the operations 190–196.

The write operation 200 reads the application state $A_4$ and writes object state $O_3$. The corresponding write graph 212 is expanded to include a third node which contains object O and $W_{200}$ (i.e., write operation 200). This operation does not join the existing node containing A,O because write(200) intersect read(200) is null. The potential read-write edge becomes a real "inverse write-read" edge as a result of this write operation 200. The read operation 198 ($R_{198}$) has read the last version of O written by write operation 194 ($W_{194}$).

This means that a real flush order dependency now exists because data object O's state has been changed in the write operation 200. The flush order dependency dictates that the operation 198 in the node containing object B must be installed prior to the operations 190–196 in the node containing objects A, O. A second flush order dependency is also created by a read-write edge resulting from the write operation. In this dependency, the application object B must be flushed, thereby installing the read operation 198, prior to flushing the data object O.

The purpose of the inverse write-read edge is to ensure that data object O is not exposed when the node with operations 190–196 has no predecessors. This permits the operations 190–196 to be installed by flushing only A.

Notice that the result of write operation 200 removes data object O from the node containing operations 190–196. An object can only reside in one write graph node, which is the last node to write the object. Data object O is in nx(200) and hence is removed from the node containing operations 190–196. Here, the node containing write operation 200 is the last node to write object O, and hence, data object O resides only in that node. No subsequent operation can remove it from that node without also writing it. Because $W_{194}$ and $W_{200}$ both write data object O, and replay of $W_{194}$ does not guarantee the ability to replay $W_{200}$, there is an installation edge from $W_{194}$ to $W_{200}$. This edge results in a write graph edge from the node with operations 190–196 to the node with operation 200. There is also an edge from $R_{190}$ to $W_{200}$ so this is a case where a write graph edge results from two installation graph edges.

This is a case in which an object is removed from a multi-object node as a result of normal operation. As a result of the write operation 200, the dependency cycle that existed in the intermediate write graph 208 is now broken. That is, a single object A can now be flushed to install all operations 190–196 in the node, including the write operation 194 that originally affected the data object O.

In terms of the write graph, the write operation renders the data object O "unexposed" in the collapsed node of the write graph 212. An "unexposed" object of a write graph node is one that has a write operation for it in a succeeding node and no read operations following the current node that also do not follow the succeeding write. As a result, an unexposed object does not need to be flushed in order to install the operations in the preceding node that wrote that object as no succeeding operation needs the value that it wrote. Conversely, an "exposed" object in a node is an object that needs to be flushed to install the operations in the node that wrote that object. In the FIG. 15 example, the application object A is "exposed" in the collapsed node.

Figure 16:
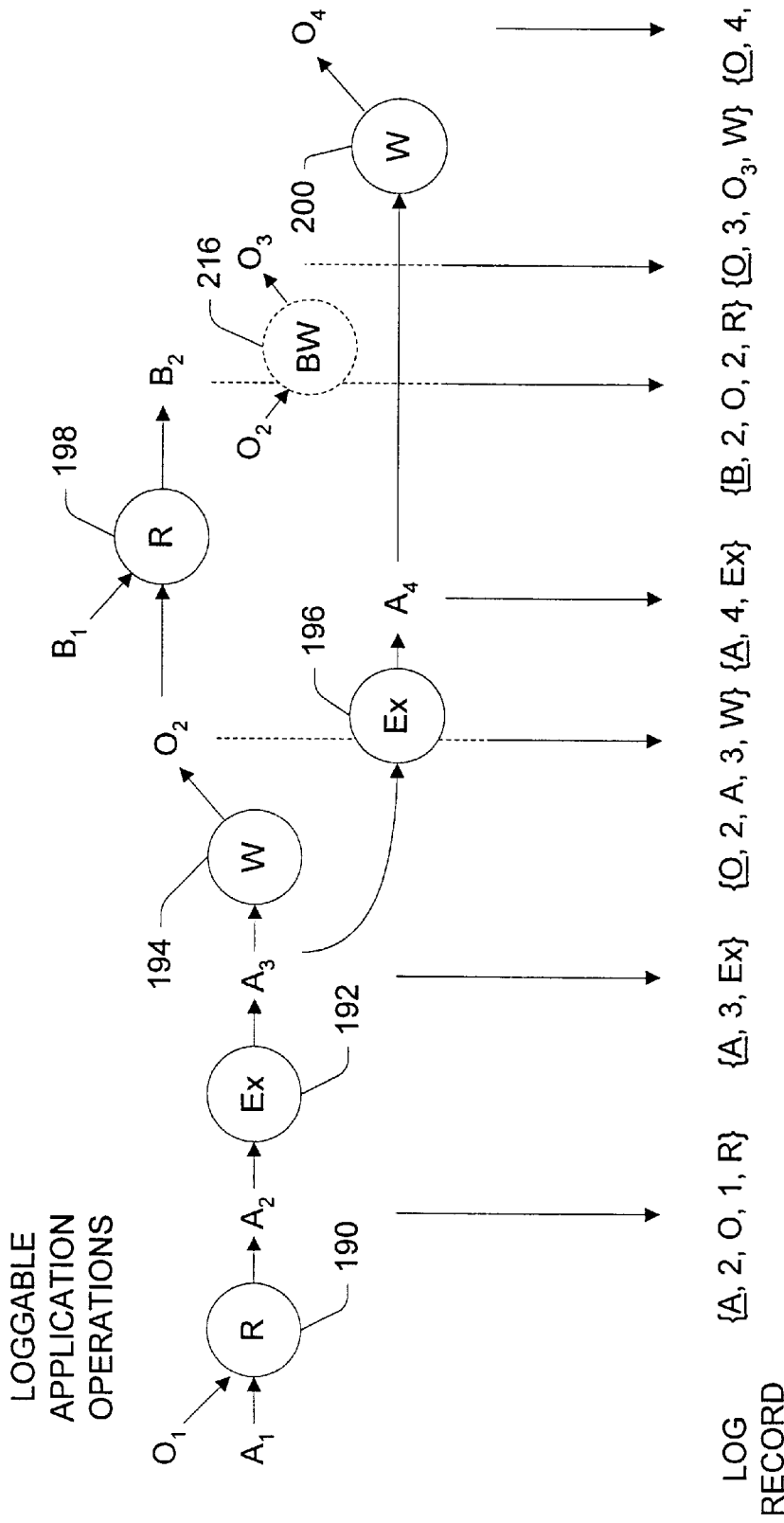
FIG. 16 is a diagrammatic illustration of the sequence of logical application operations from FIG. 15, which shows the corresponding log records for those operations.

FIG. 16 shows the corresponding log records for the sequence of operations 190–200 from FIG. 15. As a result of the log optimization technique, the log record for the write operation 194 does not contain the value written to the data object O (i.e., $O_2$). Instead, the log record for write operation 194 contains only the data object identifier O, the data object O's state ID 2, the application object identifier A, its state ID 3, and the write operation W that resulted in data object state $O_2$.

FIG. 16 also shows another technique for reducing the number of objects in a multi-object combined node. The cache manager may not wish to wait for a subsequent write operation of one of the objects in the write graph node, such as write operation 200, because such operations cannot be foreseen and are not guaranteed to occur. Accordingly, the cache manager can impose its own write of an object in the multi-object node. The cache manager performs a "blind identity" write which writes the value of the object onto the stable log. FIG. 16 shows a blind write operation 216 which writes the values of the data object O at state 3, i.e., $O_3$, to the log record. The blind write creates an after-image of the data object O on the log. That is, the blind write in this case is an identity write because the identical value of data object O, which is the same at both states 2 and 3, is written to the log. The state ID is stepped from 2 to 3 to maintain the convention introduced earlier in this disclosure.

Once the value $O_3$ is posted to stable log and all nodes that precede the node with operations 190–196 have been installed, i.e. the node with $R_{198}$, the cache manager is free to flush the application object A, thereby installing operations 190–196. If the system crashes after object A is flushed and application state $A_3$ is irretrievably lost, subsequent operations involving the data object O at state 3, can be replayed using the values $O_3$ on the stable log, rather than the values from the output buffers of a regenerated application state $A_3$. Blind writes come at a cost of writing larger amounts of data to the log, but this cost is minimal in comparison to the advantages gained by the write optimization techniques in which a high percentage of writes do not result in posting entire object values to the log.

The cache manager-imposed blind write has the same affect of removing an object from the collapsed node in the write graph as a normal write operation. But such a write is under the control of the cache manager, and hence the cache manager can use such writes to help it manage the cache.

Figure 17:
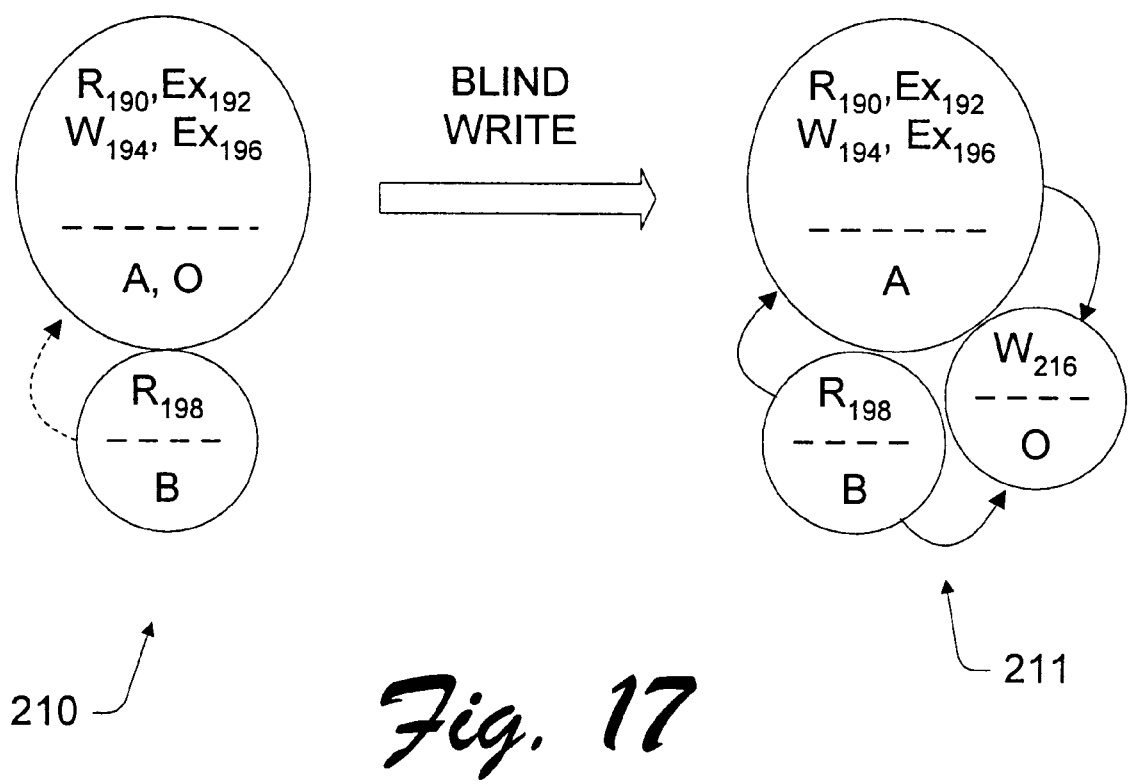
FIG. 17 is a diagrammatic illustration showing how a blind write operation initiated by the cache manager affects a multi-object write graph.

FIG. 17 illustrates the effect of a blind write on the combined node in write graph 210 of FIG. 15. In a blind write, the cache manager posts the current value of the data object O to the stable log. This is represented in a write graph 211 as a new node containing the object O and a blind write operation (i.e., $W_{216}$). Since the value of O is written to the log, the data object O does not need to be flushed concurrently with the flushing of application object A, and hence the O→A dependency is removed. The blind write thereby breaks the dependency cycle.

In write graph terms, the data object O is no longer "exposed" in the is combined node and is withdrawn from that node. The cache manager no longer needs to flush object O as part of the installation of the operations 190–196 in the combined node because it does not matter what object O's value is. The cache manager need only flush the exposed application object A to install all operations in the node, including those that had written data object O, even though data object O is not flushed.

It is noted that, for combined nodes having more than two objects that require simultaneous flushing, the cache manager blind writes all but one object to the stable log.

Figure 18:
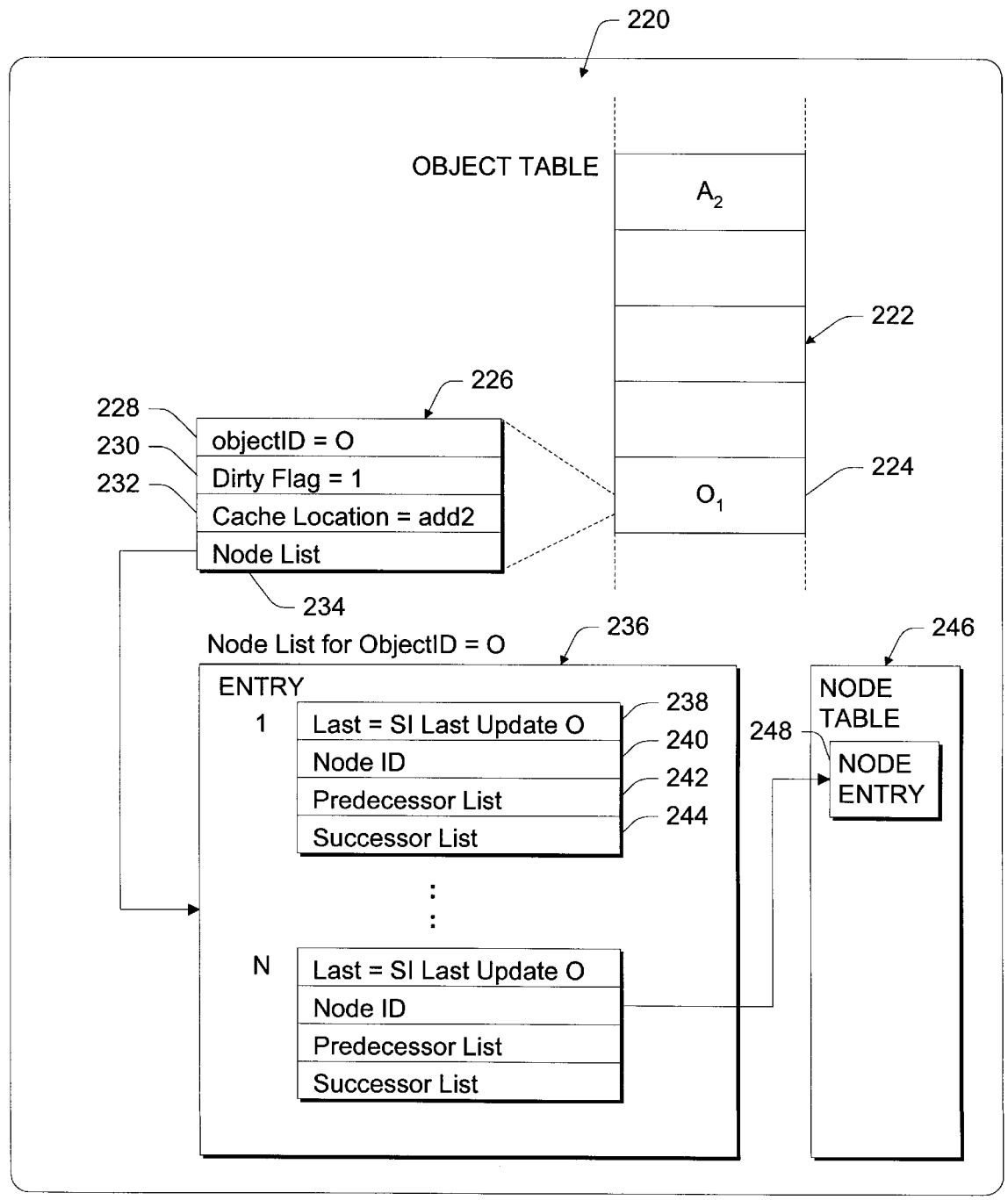
FIG. 18 is a diagrammatic illustration of a cache manager with an object table that is constructed to track dependencies introduced through both read and write operations.

FIG. 18 shows a cache manager 220 with an object table 222, which are configured to track dependencies, including cyclic dependencies, and to manage the object flushing sequence to properly handle the dependencies. The object table 222 holds a list of objects that are presently stored, and in some cases recently stored, in the volatile cache. These objects may be application or data objects.

The object table 222 shows an entry 224 for the data object. The entry is organized in data structure 226 having an object identifier field 228, a dirty flag field 230, a cache location field 232, and a node field 234. The node field contains an index to a separate node list 236 of intermediate write graph nodes. These nodes all write to the object with entry 224. Given that operations write at most one object, an operation can always be associated with exactly one entry in the object table, i.e. the entry whose object it wrote. All intermediate write graph nodes also have operations that write exactly one object. The node list is a list of these intermediate write graph nodes containing operations that write the object table entry.

The node list 236 is a data structure containing various entries 1, ..., N. Each entry contains a "Last" field 238 that holds data indicating the last update to the object O as a result of the operations of the node. The "Last" field 238 is set to the state identifier of the object at its last update by operations of the node described by node list entry 236. The node list entry also has a node identifier 240 to identify the write graph node into which this intermediate graph node has been collapsed should the node be part of a cycle (a strongly connected region) in the intermediate write graph. In this implementation, the node ID field 240 is an index to a separate node table 246. This data structure contains an entry 248 for write graph nodes that are produced as a result of an intermediate graph collapse. Each such write graph entry has a list of all intermediate graph nodes from which it is constituted via a collapse. These intermediate write graph nodes are identified by pairs <O,O.sid>.

As explained above with reference to FIG. 15, an object can be written by operations in more than one node. The write graph 212 (FIG. 15), for example, shows that data object O, while only requiring flushing in one node, is updated by operations in two different nodes. The node ID fields 240 of all intermediate write graph nodes are "null" until a cycle exists. When a cycle arises, the node ID of the intermediate write graph nodes in the cycle are set to the write graph node identified by entry 248 in the node table 246, which includes the intermediate nodes of the cycle.

Each node list entry in node list 236 further has a predecessor list 242 and a successor list 244. These lists are similar to those described above with respect to FIG. 11 in that they reference predecessor or successor write nodes (in this case, intermediate write graph nodes) which should be flushed before or after the subject node. Each item in the predecessor list 242 or successor list 244 must identify a predecessor or successor node. Since an object can be written by operations in multiple write graph nodes, the object's identifier is no longer sufficient for this node identification. The node can be identified, however, via a pair <object id, state id>, where the state ID is that of the Last attribute for the node at the time the write graph edge was formed. (This can be used in a look up that finds the node with the smallest Last value that is greater than this state ID.) Thus, a node on a predecessor or successor list can be represented by:

$$N_x = \text{<Object ID of X, State ID of X>}$$

In addition, as in FIG. 11, real and potential predecessors need to be distinguished. This is done by storing with the predecessor list entry the state ID of the current object O of entry 226 that was read by the first operation causing the edge described by the predecessor entry. The state ID is denoted by $firstr(N_x,O)$. Thus, a predecessor list entry is represented by the following format:

$$\text{<}firstr(N_x,O),N_x\text{>}$$

The node being referenced in the predecessor and successor lists is an "intermediate node," not the write graph node. Multiple intermediate nodes may comprise a write graph node, which is found from the entries via the Node ID field 240.

A successor list entry need only identify the successor intermediate node by a pair <object id, state id>.

The entries 1-N in the node list 236 are ordered according to the update order sequence. This sequence is readily derived in the data structure by placing the entries in ascending order according to the state identifier in their "Last" field 238.

Figure 19:
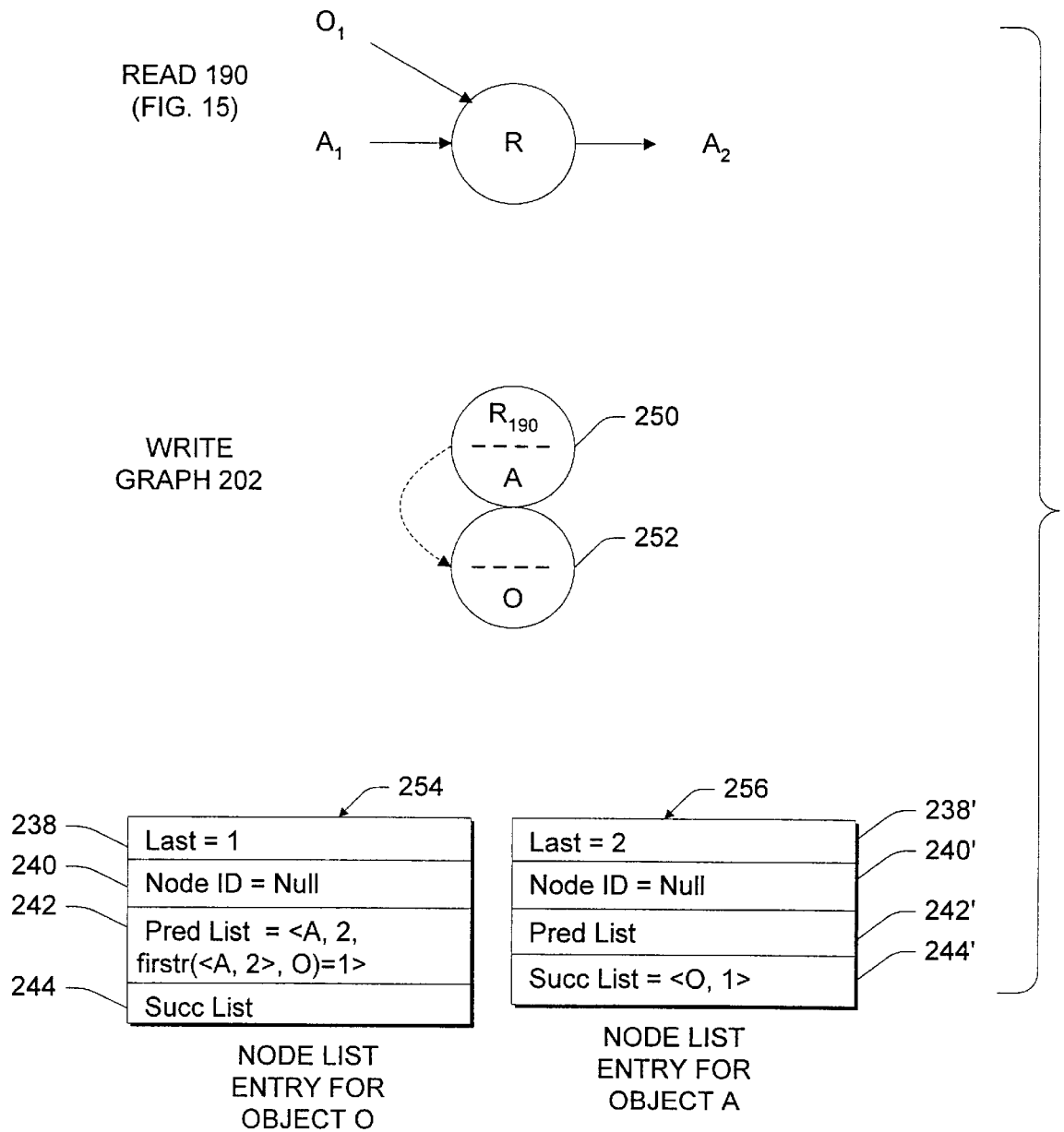
FIG. 19 is a diagrammatic illustration showing a read operation, its corresponding representation in terms of a write graph, and how the cache manager tracks any dependencies in the object table.

The cache manager 220 uses the object table 222 to track the flush order dependencies that arise in both read and write operations. Consider the case of a read operation. FIG. 19 shows the read operation 190 from FIG. 15 in more detail. Read operation 190 involves reading both application state $A_1$ and object state $O_1$, and writing application state $A_2$. The intermediate write graph fragment 202 for this operation includes a node 250 containing A and the read operation $R_{190}$, and a node 252 containing O without any operations. The read operation 190 results in a potential edge from the node containing A to the node containing O, indicating that a subsequent write or update of data object O to change its state will create a real edge.

As a result of the read operation, the cache manager creates a node entry 254 for the data object O's node list 236 which recognizes object A as a predecessor. Entry 256 is only a "potential" node list entry at this point since a write graph node technically only exists when uninstalled operations write into variables. That is, the node containing data object O becomes a write graph node in write graph 206 following the write operation 194. A node is shown in FIGS. 15 and 19 to help describe how data object O is handled.

More particularly, node list entry 256 has a "Last" field 238 set to "1," the state ID of data object O's last update, and a node ID field set to "null", indicating that this node has not taken part in a "collapse". The predecessor list 242 is updated to reference the predecessor application object A. This node reference includes the predecessor object ID "A," and A's state ID of 2. In addition, to determine when this edge is real or potential, the node reference includes "firstr (<A,2>,O)," indicating the state ID of data object O when first read by application object A in this node, which is 1. The edge is real only if data object O has a state ID that is greater than 1. Nothing is placed in the successor list 244.

Similarly, the cache manager creates a node entry 256 for the application object A's node list which recognizes data object O as a successor. Entry 256 contains in its "Last" field 238' the state ID of "2" for the application object A's last update and in the node ID field 240' it contains the value null, indicating that this intermediate write graph node is not part of a cycle and hence has not taken part in a collapse. The successor list 244' of entry 256 is updated to reference the successor data object O. This successor reference to identify the node for object O includes the successor object ID "O," and O's state ID of 1. Nothing is placed in the predecessor list 242'.

Figure 20:
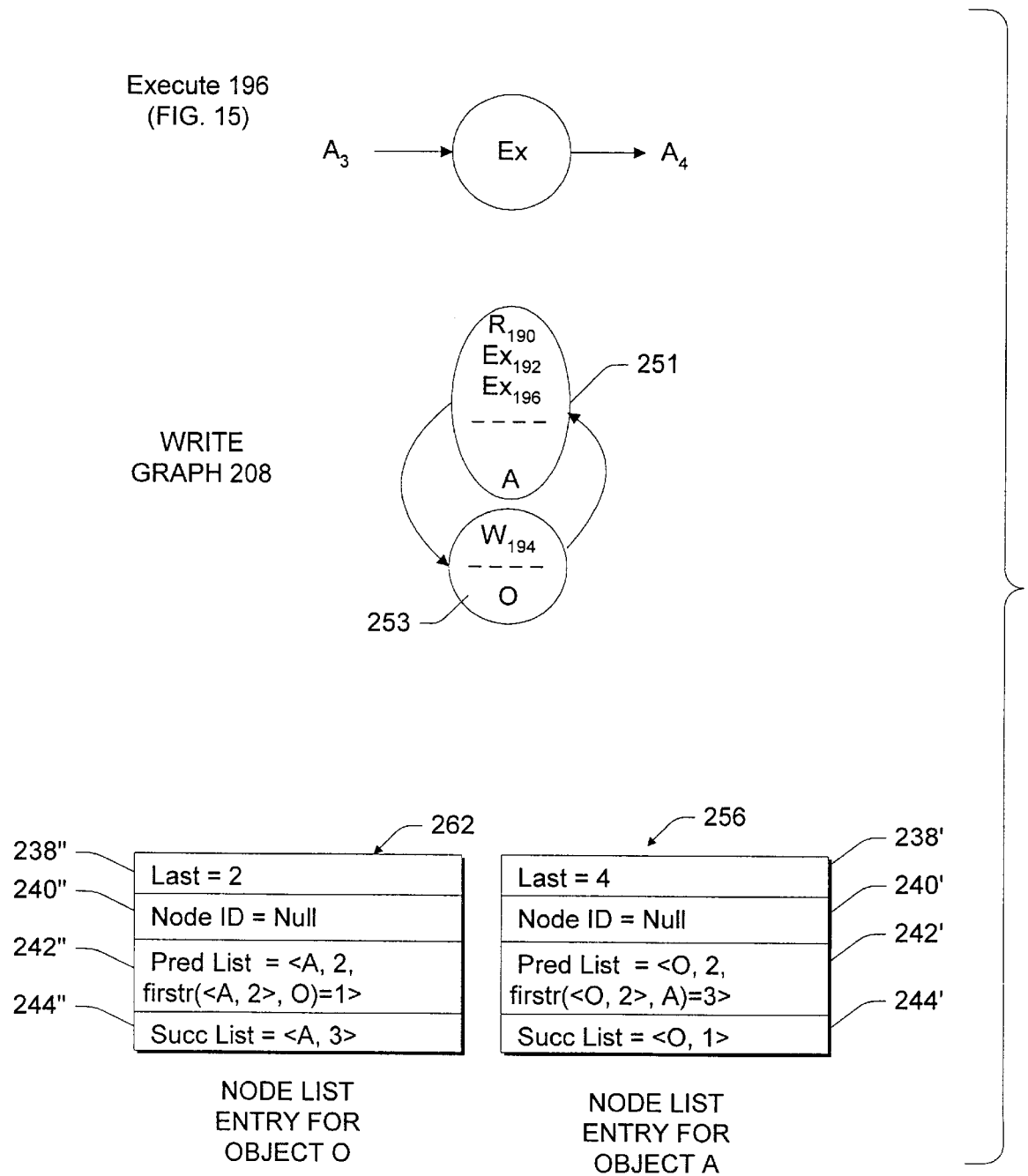
FIG. 20 is a diagrammatic illustration showing a write operation, its corresponding representation in terms of a write graph, and how the cache manager tracks any dependencies in the object table.

Next, consider the case of the write operation. FIG. 20 shows the write graph 208 following the execute operation 196 and write operation 194 from FIG. 15 in more detail. Write operation 194 involves reading application state $A_3$ and writing object state $O_2$. Execute operation 196 involves reading application state $A_3$ and writing application state $A_4$. The write graph 208 as a result of this operation includes the node 251 containing A and the node 253 containing O. The write operation 194 represented in node 253 changed the data object state from state $O_1$ to state $O_2$, thereby changing the previous "potential" edge to a "real" edge (as represented by the solid arrow). This correlates to object A becoming a real predecessor to object O. Additionally, recall in the write graph 206 of FIG. 15, a second potential edge had been created as a result of the write operation 194 because data object O, to be replayed, must obtain values from application object A at state 3. This successor edge becomes real in write graph 208 of FIG. 20 because the downstream execute operation 196 changes the application state from state 3 to state 4. Thus, the write graph 208 in FIG. 20 shows two real edges between the nodes 251 and 253.

The old entry 254 representing a potential write graph node for data object O is replaced by a real write graph node list entry 262. Entry 262 for data object O is created in response to the writing of data object O at operation 194. The entry 262 has a "Last" field 238" set to the object O's state ID following the write operation 194 (i.e., state ID=2), and a node ID field 240" set to null. The predecessor list 242" in entry 262 includes the same reference to predecessor object A as is contained in the predecessor list 242 in entry 254. The successor list 244" in entry 262 is updated to reference the successor object A. This reference includes the successor object ID "A" and A's state ID of 3. Whether a successor is considered "potential" or "real" has little impact. When the predecessor is flushed, the predecessor is removed from its successors' predecessor list entries, regardless of whether it is real or potential.

With respect to the node list entry 256 for application object A, the "Last" field 238' has been updated to reflect a state 4 since this is the state at the execute operation 196. (FIG. 20 shows the data structures after this operation, but before the collapse of the cycle that is now present.) The cache manager also updates the predecessor list 242' of the node list entry 256 for application object A to reference the "potential" predecessor object O. This node reference includes the predecessor object ID "O," and O's state ID of 2. In addition, to determine when this edge is real or potential, the node reference includes "firstr(<O,2>,A)," indicating the state ID of application object A when first read to write the data object O at state 2, which is a state ID of 3. The edge is real only if application object A has a state ID that is greater than 3. FIG. 20, because it shows the write graph 208 after the execute operation $Ex_{196}$, shows the edge as real, with the Last field of 256 set to 4.

Notice that the node list entry 256 for application object A references node list entry 262 of data object O as both a predecessor and a successor. This correlates to cycle dependency in that the data object O must be flushed both before (or not later than) and after (or not earlier than) application object A.

The cache manager recognizes this cyclic condition when it occurs, or when the cache manager goes to flush the application object A. For purposes of continuing discussion, suppose the cache manager decides to flush the application object A. The cache manager proceeds down A's node list, which contains the single entry 256, and discovers the cycle dependency. When a cycle between the intermediate write graph nodes 251 and 253 is discovered, the nodes 251 and 253 are collapsed into a single node.

Figure 21:
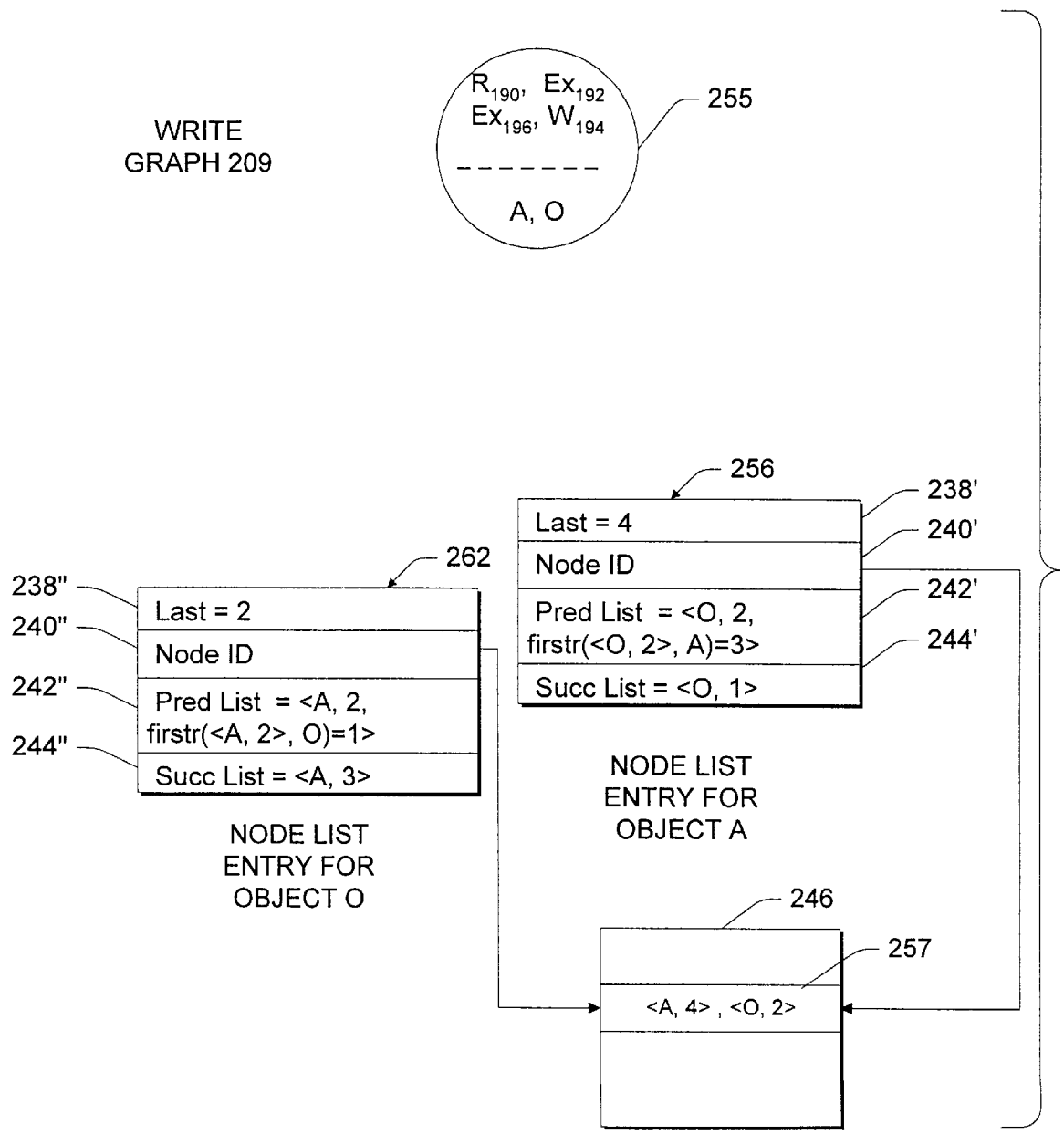
FIG. 21 is a diagrammatic illustration showing a write graph with a combined node formed from two collapsed nodes, and how the cache manager tracks this event.

FIG. 21 shows a write graph 209 having a combined write graph node 255 formed by collapsing nodes 251 and 253 into one node following the execute operation 196 (i.e., $Ex_{196}$). The node ID field 240" of object O's node list entry 262 is switched from "null" to reference an entry 257 in the node table 246. Additionally, the node ID field 240' of object A's node list entry 256 is changed from "null" to reference the entry 257. The node table entry 257 lists all intermediate graph nodes (identified by pairs <Object, Object State ID>) from which it is constituted via the collapse. In this example, the node table entry 257 identifies the node 251 as <A, 4> and the node 253 as <O, 2>.

To break the cycle dependency and flush the object A by itself, the cache manager first installs all write graph nodes preceding the object A. In this case, the only real predecessor node (which is a node of the intermediate write graph) contains object O, which forms the cycle dependency with A and hence is to be flushed simultaneously with the application object A. The cache manager then blindly writes the data object O listed in the predecessor list 242' of object A's node list entry 256 to the stable log. That is, the values of the data object at state 2 (i.e., $O_2$) are posted to the stable log. This is shown in FIG. 16 as the blind write 216, which results in a log record containing the value $O_2$.

Figure 22:
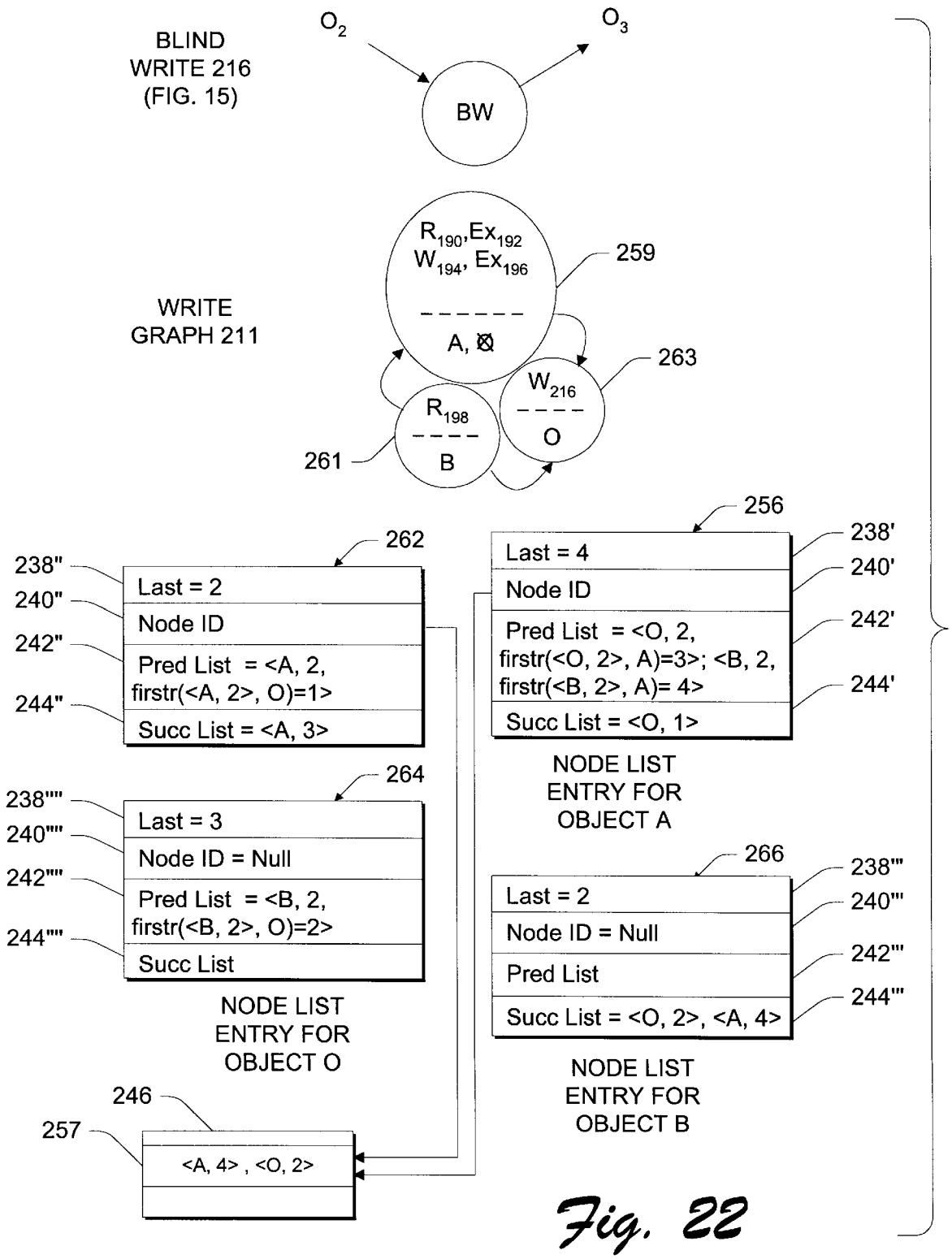
FIG. 22 is a diagrammatic illustration showing a blind write operation to break a cycle dependency, its corresponding write graph, and how the blind write affects the object table.

FIG. 22 shows the blind write operation 216 of data state $O_3$ and a corresponding write graph 211. The write graph 211 contains three nodes: a node 259 containing exposed object A and unexposed object O, a node 261 containing exposed object B, and a node 263 containing exposed object O. As a result of the write operation 216, a second entry 264 is added to the node list for data object O. This second entry 264 has a last field 238"" set to a state ID of 3, a node ID field 240"" set to null, a predecessor list field 242"" set to reference the node 261 containing application object B as a real predecessor node, and a successor list field 244"" set to null. The node list entry 256 for object A is also updated following the write operation 216. The last field 238' has been updated to A's last state ID of 4, and the predecessor field 242' is updated to identify the node 261 containing application object B as a predecessor node.

Notice that the node ID fields in A's node list entry 256 and O's node list entry 262 remaining pointing to entry 257 in the node table 246. The cycles have not yet disappeared. The node for data object O in the cycle is no longer the last node for object O, so object O is not in vars(257). But the operations that previously wrote data object O are still in node 259, and this is what is captured by having the node IDs continue to reference 257. The blind write operation 216 rendered object O "unexposed" in node 259 and creates a new intermediate write graph node 263 for data object O.

A node list entry 266 for the application object B is also shown in FIG. 22. This entry 266 reflects the node 261 that was created by the read operation 198 in FIG. 16, prior to the blind write operation 216. The object B's node list entry 266 has a last field 238'" set to B's last state ID of 2, a node ID field 240'" set to null, a predecessor list field 242'" set to null, and a successor list field 244'" set to identify the nodes 259 and 263.

Notice that the predecessor list field 242' in object A's entry 256 still contains reference to the data object O. Predecessors are only removed when a flush occurs, and not as a result of the blind write operation 216. This is because there can be other operations on other objects that continue to depend on the prior version of the just logged object. However, the blind write does remove the blind written object O from the objects that need to be flushed simultaneously with object A.

Figure 23:
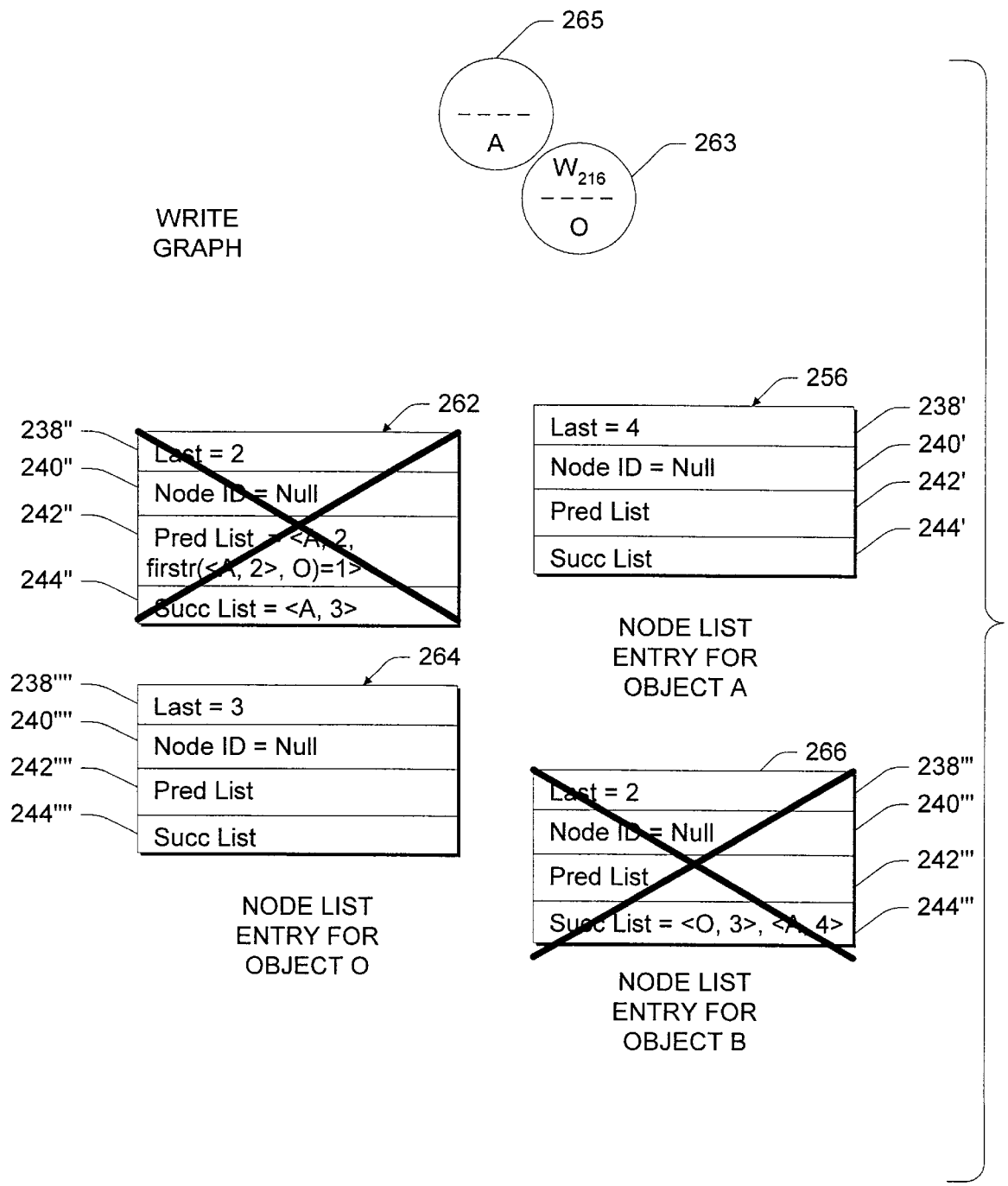
FIG. 23 is a diagrammatic illustration showing how flushing an application object affects the write graph and object table.

Suppose the cache manager wishes to flush application object A. Before doing that, the node containing A must not have predecessors in the write graph. Thus, the cache manager must first flush B to remove B's node 266 from the write graph. Next, the cache manager flushes the application object A, thereby installing the operations 190–196 contained in node 259 of FIG. 22, which is represented by node table entry 257 of FIG. 21. FIG. 23 shows the results of flushing application object A. The object O's node list entry 262 which contains reference to the node 259 via node table entry 257 that it references via its node ID field is removed as these states are now installed. The successor list field 244' in A's entry 256 is updated to remove all successors since A has now been installed. That is, the flushing of A leaves it's node list entry 256 with no successors. Accordingly, this flushing operation removes the intermediate graph cycle dependency as the node list entry 256 for application object A no longer contains reference to data object O in either the successor or predecessor list fields.

The write optimization techniques described in this section are beneficial because they eliminate having to always post the written values to the log. This greatly reduces the processing time cost during normal operation, at the expense of more costly recovery processing. With the optimization, the log only contains information to reference its source object and the state ID of the values that are written. While this reduces the amount of data to be logged, the write optimization techniques introduce dependencies between objects, and often troubling cycle dependencies. The cache manager tracks dependencies via an object table and is configured to recognize cycle dependencies.

When a cycle dependency is realized, the cache manager initiates a blind write of one or more objects involved in the cycle to place the object's values on the stable log. This step breaks the cycle. Thereafter, the cache manager flushes the objects according to an acyclic flushing sequence that pays attention to any predecessor objects that first require flushing.

Recovery Optimization

During recovery, the database computer system can invoke a conventional recovery manager to recover the application state and object state at the instance of the crash. The conventional recovery manager retrieves the most recently flushed data objects and application objects in the stable database. The recovery manager then replays the stable log, beginning at a point known to be earlier than the oldest logged operation that was not yet installed. For this conventional physiological operation recovery, the recovery manager compares the state ID of each logged operation in the stable log with the state ID of a retrieved data object or application object. If the state ID of the logged operation is later than the state ID of the stable object, the recovery manager redoes that logged operation.

Figure 24:
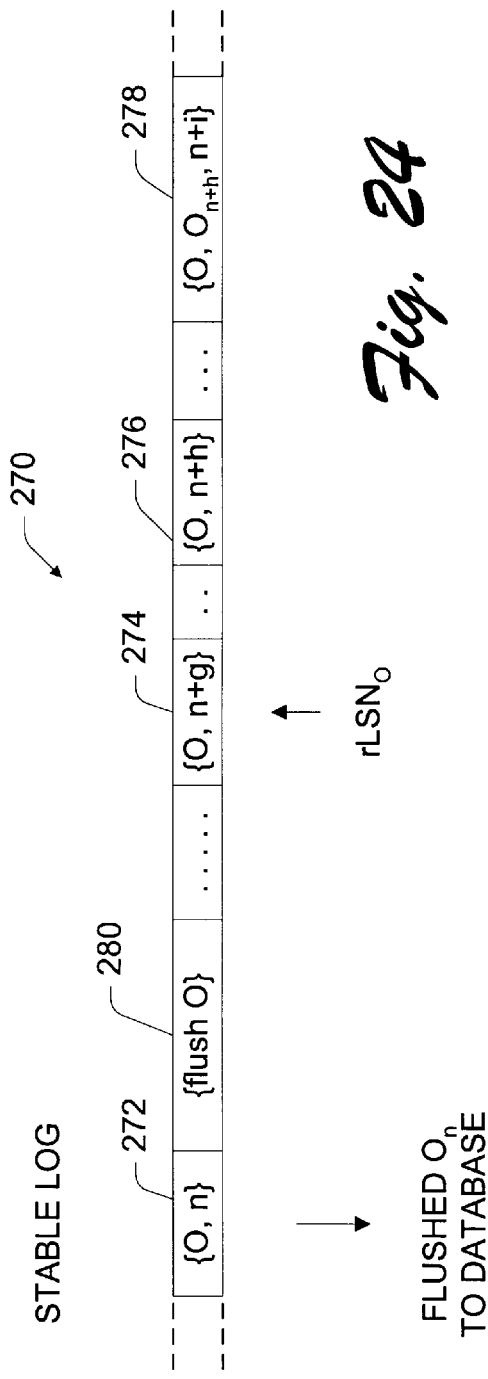
FIG. 24 is a diagrammatic illustration showing an excerpt of a stable log having log records and a conventional approach to identifying a point in the log to begin replaying operations during recovery.

FIG. 24 pertains to a conventional recovery approach that can be used in conjunction with aspects of this invention. FIG. 24 shows an excerpt from a stable log, referenced generally as number 270, having a series of log records posted as a result of computer application operations. For purposes of discussion, assume that the log records in log record 270 pertain only to data object O and application object A. Only log records for data object O are described.

The log excerpt shows five log records 272–280 pertaining to operations that affect data object O. The first log record 272 contains the object ID "O" and state ID "n" to reflect that the data object O was written or updated to a state tagged with a state ID of "n." Two subsequent log record 274 and 276 reflect that the data object O is written two more times, at states n+g and n+h. A fourth log record 278 reflects that the entire value for the data object O at state n+h (i.e., $O_{n+h}$) is written to the stable log, as is the case for a blind write operation, at a state ID of "n+i".

Each log record is assigned a log sequence number (LSN). The LSN is a monotonically increasing number that is tagged to each log record to identify the order in which the log records are created in the log. Typically, the LSN is used as the state ID, making the state ID and LSN the same. The LSN for the log records 272–278, for instance, are n, n+g, n+h, and n+i.

Suppose that the cache manager flushes the data object at its state "n" (i.e., $O_n$) to the non-volatile database. This event is recorded as log record 280 that identifies the data object O as having been flushed. All log records for the data object O that precede log record 272 are no longer needed for replay during recovery. In fact, log record 272 is not really needed for replay because it simply identifies the exact object state that is present in the database. Rather, the first meaningful log record for recovery purposes is the first log record reflecting an operation that updates the data object O, thereby changing its state, without the updated data object O being flushed to install the operation. In this example, the first meaningful log record is record 274.

At the time that data object O is flushed, the cache manager marks object O as clean (the dirty flag is reset) in the cache. When O is updated at log record 274, the cache manager sets a recovery log sequence number (rLSN) to identify the log record 274 as the starting point for replay of object O during recovery.

Each object has its own rLSN. In this example, data object O has an rLSN and application object A has a separate rLSN (not shown). During recovery, the recovery manager examines the last checkpoint record on the stable log, which contains initial values of rLSNs for all dirty objects as of the time of the checkpoint. Subsequent logging of flushes merely updates which objects are clean or dirty and advances rLSNs as these changes occur. Alternatively, the checkpoint record can indicate the value of the minimum rLSN, so that the individual rLSNs can be recomputed based on the updates to objects and their flushing. But in this case, it needs to at least bound the rLSN before proceeding. The recovery manager then begins its redo test at the minimum $rLSN_{min}$. The recovery manager examines every record thereafter to determine whether to replay the operation. This portion of the log after the $rLSN_{min}$ in is known as the "active log tail."

A shortcoming of this conventional recovery technique is that the recovery manager can end up replaying many operations that are unnecessary for recovery. As an example, the lifetimes of some application objects and data objects tend to be short and once terminated or deleted the objects no longer need recovery. If a system failure occurs after an object has terminated, but while that object's updates remain on the active log tail, the recovery manager still redoes the operations for that object starting from the last stable version of the object. If the object's state was never written to stable memory, all updates reflected in the log records are redone. Unfortunately, the replayed operations for these terminated or deleted objects are unnecessary, and can add substantially to recovery time.

Accordingly, an aspect of this invention is to optimize recovery to avoid replaying operations that are rendered obsolete by subsequent operations. In general, the recovery optimization technique involves advancing an object's rLSN to a log record later in the stable log that reflects the object at a state in which the operations that have written that object state are installed. Normally, flushing the object to non-volatile memory is what installs earlier operations and so capturing the change in rLSN could be done by logging the object flushes. But when dealing with objects that are "unexposed" in the write graph, the operations leading to a particular object can be installed without that object itself being flushed.

Recall the discussion from FIGS. 16 and 17. A blind write operation posted the value of data object O to the stable log and thereby rendered the data object O "unexposed" in the write graph node containing application object A, meaning that the prior value of O was no longer needed at the time when the write graph node is installed. The flushing of application object A installed all operations (i.e., $R_{190}$, $Ex_{192}$, $W_{194}$, and $Ex_{196}$), including the write operation $W_{194}$ that had written the data object O, even though the data object O itself was not flushed.

Figure 25:
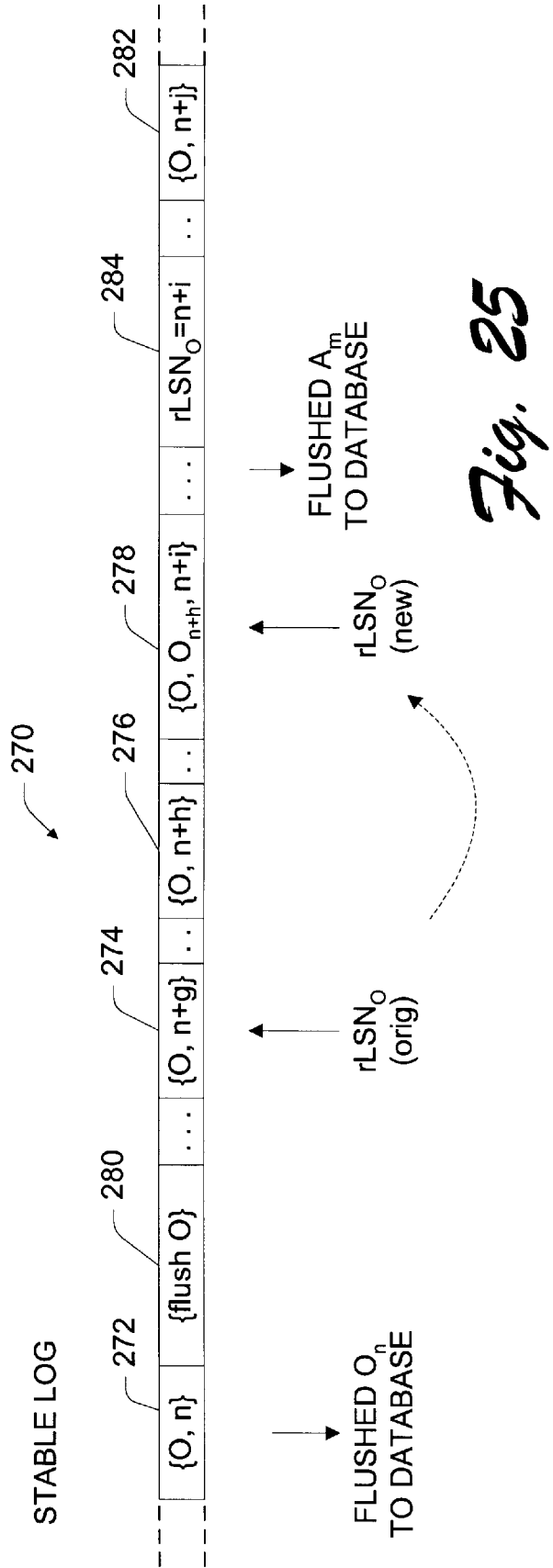
FIG. 25 is a diagrammatic illustration showing the stable log of FIG. 24 and a recovery optimization technique for identifying a point in the log to begin replaying operations during recovery according to an aspect of this invention.

FIG. 25 shows an example of the recovery optimization technique for the same stable log 270. Suppose that log record 278 represents a blind write operation in which the cache manager posts the values of data object O at state ID of "n+h" (i.e., $O_{n+h}$) to the stable log. The blind write renders the data object O "unexposed" in the write graph node containing both objects A and O, as described above with respect to FIG. 17.

Sometime after the blind write operation, the cache manager flushes the "exposed" application object A at state "m" (i.e., $A_m$) to install all operations in the write graph node, including any operations that have written the data object O. The blind write and subsequent flushing of application object A renders all operations that wrote the "unexposed" data object O as part of the operations associated with the node for application object A (e.g., log records 274 and 276 unnecessary for recovery.

The cache manager advances the $rLSN_A$ for the "exposed" application object A (not shown in this figure) because all preceding operations affecting A are now installed, akin to the customary case shown in FIG. 24. Similarly, the cache manager advances the $rLSN_O$ for the "unexposed" data object O from its original point at log record 274 to the new location after log record 278 as if the unexposed data object O had also been flushed. Record 278 is the next log record, after the records for the installed operations, that contains an operation writing data object O. The rLSN of object O is logged as a record 284 to reference the log record 278 with the log sequence number of n+i. In this manner, the recovery manger treats "unexposed" objects as if they had been flushed as of their last update in the write graph node being installed by the flushing of the node's exposed variable(s). By logging the rLSN, recovery for O can begin at log record 278.

Figure 26:
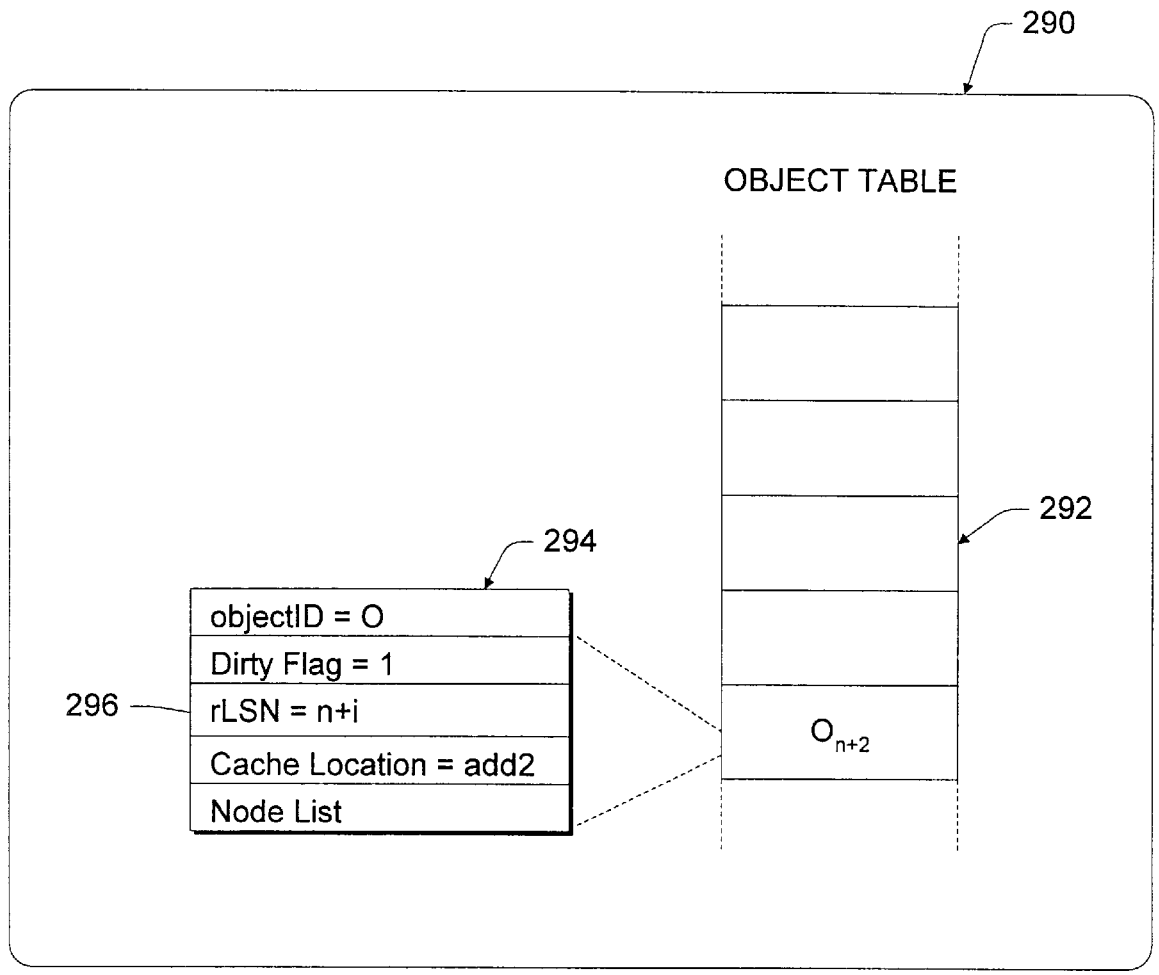
FIG. 26 is a diagrammatic illustration of a cache manager with an object table that is modified to track the starting log record for use in recovery.

The rLSN is recorded in the cache manager's object table. FIG. 26 shows a cache manager 290 and object table 292 that are similar in structure to that shown in FIG. 18. However, in FIG. 26, an entry 294 for data object O is modified to include an rLSN field 296, which identifies the LSN of the next log record that contains an operation writing data object O (in this case, n+i for log record 278). This log record contains the first update to O since it was installed. The dirty flag remains set to indicate that the data object has been updated since its last value was installed.

To ensure that the object table is recoverable, and hence the rLSNs, the rLSN is also posted to the stable log as its own log record. FIG. 25 shows a log record 284 that contains identification of the rLSN for object O.

During recovery, the recovery manager 71 performs two passes: (1) an analysis pass and (2) a redo pass. During the analysis pass, the recovery manager scans the active log tail to locate the rLSNs for all objects. In this example, the $rLSN_O$ for data object O references an LSN of n+i for log record 278. The recovery manager next identifies the minimum recovery log sequence number $rLSN_{min}$, similar to the conventional method described above. However, because the rLSNs have been advanced using the recovery optimization techniques, the $rLSN_{min}$ could be much later in the log as compared to the conventional recovery method, thereby avoiding the replay of operations that are unnecessary for recovery.

During the redo pass, the recovery manager examines all operations on the log beginning at the $rLSN_{min}$. More particularly, the recovery manager performs the following redo test for each log record in the stable log that follows $rLSN_{min}$:

1. If the LSN of the log record of object O is less than the $rLSN_O$ for object O (meaning that the operation referenced by that record occurred before the log record tagged with $rLSN_O$), the redo test is false and the operation in the log record is not replayed. This condition indicates that the operation is installed and the object is not exposed.
2. If the LSN of the log record is greater than or equal to $rLSN_O$ (meaning that it occurred after the last logged installation of object O), the redo test may be true. Data object O is read from stable storage and the LSN stored with O is then used as rLSN. The redo test is then performed using the new rLSN, and if true, the operation in the log record is replayed. This condition indicates that the operation is not installed and the variable is exposed.

The redo pass rebuilds the object table, complete with rLSNs for each object during the analysis phase. So long as the LSN of the log record for an operation involving writing O is less than object O's $rLSN_O$, the redo test returns false and the operation is ignored.

Once the log record for an object O is greater than or equal to its $rLSN_O$ (as seen in the recovered object table), the stable version of object O (if there is one) is read to compare the log LSN with the LSN stored with the value of O. (This can be higher than the $rLSN_O$ should the system have failed between the time data object O was last flushed and the time the change to its rLSN resulting from that flush was posted to the stable log. The $rLSN_O$ is set to the stable LSN of the value of O when this occurs.

Figure 27:
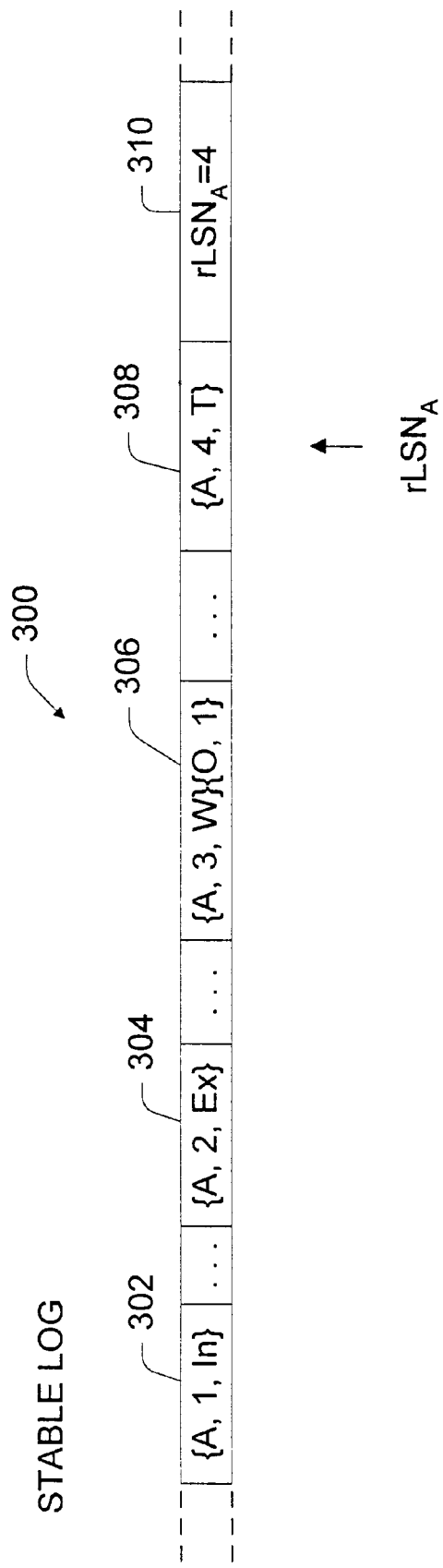
FIG. 27 is a diagrammatic illustration showing the stable log having log records for a short-lived application object.

One situation where the recovery optimization technique is helpful concerns short-lived applications that initiate, then execute and write their results, and terminate. FIG. 27 shows an exemplary excerpt from a stable log 300 having log records 302–308 for the short-lived application. The log records 302–308 correspond to the four operations: initiate, execute, write, and terminate.

The short-lived applications do not need to be replayed during recovery (assuming the results written by the application are logged or contained in a stable object). Accordingly, for such short-lived applications, the cache manager posts the $rLSN_A$ for the application object A to the last operation for object A, i.e., the terminate operation recorded in log record 308. The $rLSN_A$ is posted to the stable log as record 310. Note that the rLSN cannot be advanced simply because of the terminate operation 308, as versions of A may still be needed, e.g. to recover object O. During the redo pass of recovery, the recovery manager proceeds to the $rLSN_A$ for that application object and finds that the log record pertains to a terminate operation, which does not need to be redone.

As a result, the recovery manager avoids replaying the set of operations for the short-lived application object A. When application A has written an object O, if the value of O that A wrote has been installed (whether by explicit flush or because it is no longer exposed), A does not need to be recovered so that O can be recovered. Further, if application A reads data object O, but application A has been installed, either by flushing or because A's state is no longer exposed (e.g. it might be terminated or it might have been written to the log), then object O need not be recovered so as to recover application object A. The fact that application object A terminated is not sufficient to dispense with recovering object A as it may be needed to reconstruct objects that it wrote. However, when the terminate operation for A is installed (and at that point, A is not exposed), then we advance A's rLSN to indicate that A's recovery is no longer needed.

It should also be noted that rLSN's can be advanced without actually writing them to the log, though logging them in this way greatly simplifies the analysis pass of recovery. Without logging rLSN's, but continuing to log the flushing of objects, the analysis pass must examine each logged operation and re-create the write graph for the operations as they are encountered, based on the objects read and written by each operation. This permits the analysis pass of recovery to determine when the flushing of a variable installs unexposed objects as well. That permits it to advance the rLSN's for these objects.

The invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

I claim:

1. In a database computer system that tracks a recovery log sequence number for a corresponding object to identify a particular log record at which to begin replay to recover the object to a particular state following a system crash, a computer-implemented method comprising the following steps:

incrementally logging in a log record the recovery log sequence number; and replaying, during recovery from a system crash, operations referenced in log records identified by the recovery log sequence number.

2. A computer programmed to perform the step of the computer-implemented method as recited in claim 1.

3. A computer-readable memory that directs a computer to perform the step in the method as recited in claim 1.

4. In a database computer system that tracks a recovery log sequence number for a corresponding object to identify a particular log record at which to begin replay to recover the object to a particular state following a system crash, a computer-implemented method comprising the following steps:

advancing the recovery log sequence number to a later log record subsequent to the particular log record, the later log record reflecting the object at a state in which computer application operations that write the object state are installed in the non-volatile memory, said advancing step advancing the recovery log sequence number regardless of whether the corresponding object is flushed to the non-volatile memory; and replaying, during recovery from a system crash, operations referenced in log records that start at the later log record identified by the recovery log sequence number.

5. A computer-implemented method as recited in claim 4, further comprising the step of logging the advanced recovery log sequence number as a log record.

6. A computer-implemented method as recited in claim 4, further comprising the step of storing the recovery log sequence number in a data structure associated with the object.

7. A computer programmed to perform the step of the computer-implemented method as recited in claim 4.

8. A computer-readable memory that directs a computer to perform the step in the method as recited in claim 4.

9. In a database computer system that maintains a stable log having log records referencing computer application operations and that tracks a recovery log sequence number for a corresponding object to identify a particular log record in the stable log at which to begin replaying associated computer application operations to recover the object to a particular state following a system crash, a computer-implemented method comprising the following steps:

advancing the recovery log sequence number to a later log record subsequent to the particular log record, the later log record reflecting the object at a state in which the computer application operations that have written the object state are installed in the non-volatile memory, said advancing step advancing the recovery log sequence number regardless of whether the object is flushed to the non-volatile memory; and in the event of a system crash, analyzing the stable log to locate the recovery log sequence number and redoing operations referenced in the stable log beginning at the later log record identified by the recovery log sequence number.

10. A computer-implemented method as recited in claim 9, wherein each log record is assigned a log sequence number, further comprising the step of applying a redo test to each log record by comparing the log sequence number to the recovery log sequence number, the redo test comprising:

(a) if the log sequence number of the log record is less than or equal to the recovery log sequence number, not redoing the operation in the log record; and (b) if the log sequence number of the log record is greater than recovery log sequence number, redoing the operation in the log record.

11. A computer-implemented method as recited in claim 9, further comprising the step of logging the recovery log sequence number as a log record in the stable log.

12. A computer-implemented method as recited in claim 9, further comprising the step of storing the recovery log sequence number in a data structure associated with the object.

13. A computer programmed to perform the steps of the computer-implemented method as recited in claim 9.

14. A computer-readable memory that directs a computer to perform the steps in the method as recited in claim 9.

15. In a database computer system having a non-volatile memory, a volatile main memory, and an application object which executes from the main memory, a computer-implemented method comprising the following steps:

initiating the application object;

executing the application object;

terminating the application object without flushing the application object to non-volatile memory;

logging logical operations associated with the initiating, executing, and terminating steps;

assigning log sequence numbers to the logged operations; and setting a recovery log sequence number equal to the log sequence number of the operation associated with the terminating of the application object so that during recovery, the operations associated with the application object preceding the termination operation are not replayed; and commencing replay of the logged operations, following a system crash at the operation having the log sequence number identified by the recovery log sequence number.

16. A computer-implemented method as recited in claim 14, further comprising the step of logging the recovery log sequence number.

17. A computer-implemented method as recited in claim 14, further comprising the step of storing the recovery log sequence number in a data structure associated with the application object.

18. A computer programmed to perform the steps of the computer-implemented method as recited in claim 14.

19. A computer-readable memory that directs a computer to perform the steps in the method as recited in claim 14.

20. In a database computer system having a non-volatile memory, a volatile main memory, and an application object which executes from the main memory, and wherein the non-volatile memory includes a stable log, a computer-implemented method comprising the following steps:

executing the application object to perform operations which read data from, and write data to, a data object;

posting to the stable log a log record for each operation involving the reading or writing of data, the log record containing a reference to either the application object or the data object to identify that referenced object as a source for the data that is read from or written to;

assigning a log sequence number (LSN) to each log record;

defining a recovery log sequence number for the application object ($rLSN_A$) to identify a first log record associated with the application object and a recovery log sequence number for the data object ($rLSN_O$) to identify a second log record associated with the data object, the $rLSN_A$ and $rLSN_O$ being used to help determine at which point in the stable log to begin replaying the operations during recovery from a system crash to restore the application and data objects to their operation states just prior to the crash;

occasionally flushing the application object to non-volatile memory to install the operations performed by the application object, said flushing step further resulting in the installation of operations that wrote data to the data object;

advancing the $rLSN_A$ to identify a third log record subsequent to the first log record;

advancing the $rLSN_O$ to identify a fourth log record subsequent to the second log record, the fourth log record reflecting the data object at a state in which the operations that wrote the object state are installed in the non-volatile memory;

analyzing the stable log, during recovery from a system crash, to find the $rLSN_A$ and the $rLSN_O$;

determining, during the recovery, a minimum recovery log sequence number $rLSN_{min}$ that is the earlier of the $rLSN_A$ and the $rLSN_O$; and applying a redo test to each log record in the stable log, starting at the log record identified by the $rLSN_{min}$, by comparing the LSN of the log record pertaining to an object to the $rLSN_O$ for that object, the redo test comprising:

(a) if the $LSN \leq rLSN_O$, not redoing the operation in the log record; and (b) if the $LSN > rLSN_O$, redoing the operation in the log record.

21. A computer-implemented method as recited in claim 20, further comprising the step of logging the $rLSN_A$ and the $rLSN_O$ as log records in the stable log.

22. A computer-implemented method as recited in claim 20, further comprising the step of storing the $rLSN_A$ and the $rLSN_O$ in a data structure associated with the object.

23. A computer programmed to perform the steps of the computer-implemented method as recited in claim 20.

24. A computer-readable memory that directs a computer to perform the steps in the method as recited in claim 20.

25. A database computer system comprising:

a volatile main memory;

a non-volatile memory that persists across a system crash;

a processing unit coupled to the main memory and the non-volatile memory;

an application object stored in the volatile main memory and executable on the processing unit;

a resource manager which interacts with the application object to mediate communication between the application object and a data object so that, during a write operation, the resource manager writes data from the application object to the data object;

the resource manager being configured to log, in a log record on the non-volatile memory, operations performed by the application object and assign a log sequence number (LSN) to each log record;

the resource manager further defining a recovery log sequence number for the application object ($rLSN_A$) to identify a first log record associated with the application object and a recovery log sequence number for the data object ($rLSN_O$) to identify a second log record associated with the data object, the $rLSN_A$ and $rLSN_O$ being used to help determine at which point in the stable log to begin replaying the operations during recovery from a system crash to restore the application and data objects;

the resource manager including a cache manager to occasionally flush the application object to non-volatile memory to install the operations performed by the application object, including operations that wrote data to the data object, whereupon flushing the application object, the cache manager advances both the $rLSN_A$ and the $rLSN_O$ to subsequent log records that reflect the application and data objects at states in which the operations that wrote their states are installed in the non-volatile memory;

the resource manager further including a recovery manager that is invoked following a system crash, the recovery manager analyzing the stable log to find the $rLSN_A$ and the $rLSN_O$ and determining a minimum recovery log sequence number $rLSN_{min}$ that is the earlier of the $rLSN_A$ and the $rLSN_O$, the recovery manager applying a redo test to each log record in the stable log, starting at the log record having identified by the $rLSN_{min}$, by comparing the LSN of the log record pertaining to an object to the $rLSN_O$ for that object, the redo test comprising:

(a) if the $LSN \leq rLSN_O$, the recovery manager doe not redo the operation in the log record, and (b) if the $LSN > rLSN_O$, the recovery manager redoes the operation in the log record.

26. For use on a database computer system having a non-volatile memory, a volatile main memory, and a processor, a resource manager comprising:

a cache manager executable on the processor to track objects active in the main memory and to manage flushing of objects from the main memory to the non-volatile memory, the cache manager being configured to maintain a recovery log sequence number (rLSN) for each corresponding object to identify a particular log record at which to begin replay to recover the corresponding object to a particular state following a system crash, the cache manager advancing the rLSN for the corresponding object to a subsequent log record that reflects the corresponding object at a state in which computer application operations that wrote that object state are installed in the non-volatile memory, regardless of whether the corresponding object is flushed to the non-volatile memory; and a recovery manager that is invoked following a system crash, the recovery manager replaying, during recovery from the system crash, operations referenced in log records that start at the subsequent log record identified by the rLSN.

27. A computer-readable medium storing a cache manager as recited in claim 26.

* * * * *